United States Patent Office 3,440,192
Patented Apr. 22, 1969

3,440,192
POLYESTER-CARBOXYLIC ACID ADDUCTS AND WATER-BASED PAINT COMPOSITIONS THEREFROM
Kenneth L. Hoy, Saint Albans, and Paul C. Payne, South Charleston, W. Va., assignors to Union Carbide Corporation, a corporation of New York
No Drawing. Filed Oct. 5, 1964, Ser. No. 401,695
Int. Cl. C08g 17/16; C09d 3/64
U.S. Cl. 260—22            18 Claims

ABSTRACT OF THE DISCLOSURE

Polyester-carboxylic acid adducts having pendant carboxyl groups which are prepared by the adduction of alpha, beta-ethylenically unsaturated polycarboxylic acids or anhydrides to a significantly defined ethylenically unsaturated polyester. These adducts, after being rendered water-compatible by the reaction of the pendant carboxyl groups with a water-soluble cation, can be used to manufacture water-based coating compositions.

---

This invention relates to novel polyester compounds which have outstanding utility in coatings applications. In one aspect, the invention is directed to the preparation of modified water soluble polyesters useful in water-based coatings. In another aspect the invention is directed to water based coatings themselves. In a further aspect the invention is directed to water based enamel paints which exhibit exhibit highly desirable performance characteristics.

In recent years, a large portion of the architectural coatings market, e.g., interior and exterior paints, has been captured by water based latex paints. Particularly in the area of flat wall paints, the ease of handling and the non-odiferous qualities of these water-based latexes has resulted in widespread consumer acceptance. However, there exists a large demand for an enamel coating possessing these same advantages, which to date, these water-based latexes have not been able to fulfill. Moreover, the inherent water and chemical sensitivity of the more common alkyd resin-based enamels have fostered the introduction of more expensive coatings, such as urethanes and the like for specialty applications. These coatings provide none of the handling advantages of water based latexes, yet command premium prices.

In accordance with one aspect of the invention there is provided a polyester-carboxylic acid adduct which provides a base resin which shows outstanding properties in a broad spectrum of coating compositions ranging from enamels and varnishes to flat paints. In accordance with another aspect of the invention there is provided a water compatible salt of the said adduct. In accordance with the ultimate aspects of this invention there are provided a variety of novel coating compositions ranging from clear glossy varnishes and highgloss enamel paints through flat interior wall paints, all of which are characterized by the inherent advantages of a water based coating.

The novel polyester carboxylic acid adducts which form the basis for these superior novel water based coatings are prepared by (1) formation of a polyester by reaction of a polycyclic hydroxy compound such as a polycyclic polyol or a monoepoxy polycyclic alcohol, an unsaturated fatty acid and a polyfunctional carboxylic acid and/or anhydride and (2) the subsequent adduction to the polyester so formed of an $\alpha,\beta$-ethylenically unsaturated dicarboxylic acid to produce a polyestercarboxylic acid adduct having pendant carboxyl groups. These adducts may then be rendered "water compatible" by forming hydrophilic salts, e.g., quaternary ammonium salts at the carboxyl sites of the adduct. Ultimately a broad spectrum of paint compositions may be produced by formulating the water soluble polyester with organic cosolvent, pigments, colorants, driers and the like to produce bake drying or heat drying coatings having a variety of end uses.

The novel polyester-carboxylic acid adduct and water soluble polyester produce novel coatings which demonstrate a degree of hardness and flexibility not heretofore attainable with water-based coatings, and indeed with many oil based alkyd coatings. Moreover, the novel compositions of the instant invention demonstrate excellent resistance to attack by water, solvents and chemicals, and excellent retention of gloss upon exposure to sunlight and weathering.

As hereinbefore indicated, the basic molecule upon which the novel coatings of this invention are based is a polystercarboxylic acid adduct. The first component employed in the preparation of these novel polyester-carboxylic acid adducts is a polycyclic compound containing moieties which will form esters upon reaction with the carboxyl groups of a carboxylic acid or with the carboxy groups of a polycarboxylic acid anhydride, i.e., hydroxyl groups and vicinal epoxy groups.

Since the activity of these polycyclic compounds is measured according to hydroxyl content or effective hydroxyl content (since vicinal epoxy groups may be regarded as two latent hydroxyl groups), and since these polycyclic compounds are made to react with carboxylic acids or carboxylic acid anhydrides to form esters, for the purposes of this application, these compounds will be herinafter termed polycyclic hydroxy compounds.

The polycyclic hydroxy compounds useful in the compositions of this invention contain no more than two cyclic vicinal epoxy groups and contain at least three equivalents in the form of hydroxyl groups or cyclic vicinal epoxy groups (the said cyclic vicinal epoxy groups each accounting for two hydroxyl equivalents). These polycyclic hydroxyl compounds are characterized by (1) a polycarbocyclic ring structure, preferably saturated, comprising at least one integral bicyclo[2.2.1]-heptanoid ring structure alone or as part of a fused polycarbocyclic ring system having up to 6 carbocycles, preferably up to 4 carbocycles, each carbocycle preferably containing from 5 to 6 carbon atoms, and (2) at least 3 hydroxyl equivalents in the form of cyclic vicinal epoxy groups (i.e., vicinal epoxy groups whose vicinal carbon atoms are part of the above polycarbocyclic ring) and/or in the form of hydroxyl groups, said hydroxyl groups being bonded to the polycarbocyclic ring directly or through a bivalent organic radical. Since a single vicinal epoxy group will react with two carboxyl groups, the polycyclic hydroxy compounds of this invention will minimally contain at least one vicinal epoxy group together with one hydroxyl group or at least three hydroxyl groups. The polycyclic hydroxy compounds may preferably contain up to about eight hydroxyl equivalents. As hereinbefore set forth, the hydroxyl groups are bonded to the polycyclic ring directly or through a bivalent organic radical preferably an alkylene, alkylenoxy, or poly(alkylenoxy) group. These bivalent radicals can contain a plurality of hydroxyl groups, preferably up to six. The bivalent alkylene moieties preferably contain from 1 to about 6 carbon atoms. In the particular case of the polyalkyleneoxy radicals, these preferably are identified by repeating alkylenoxy units containing from two to four carbon atoms such as, for example, ethylene, 1,2-propylene, 1,3-propylene, 1,2-butylene, 2,3-butylene, 1,3-butylene, and 1,4-butylene and the like. The hydroxypolyalkeneoxy substituents are preferably relatively short chain groups i.e., containing up to about 5 repeating alkyleneoxy units, since these substituents tend to diminish the hardness, and also increase the drying time of the ultimate coating.

Accordingly, the polycyclic hydroxy compounds useful in the compositions of this invention may be considered to be of the classes of monoepoxy polycyclic alcohols, monoepoxy polycyclic polyols, diepoxy polycyclic compounds, diepoxy polycyclic alcohols, diepoxy poycyclic polyols and polycyclic polyols, all of which compounds contain at least 3 hydroxy equivalents.

These polycyclic hydroxy compounds are believed to be responsible, to a large extent, for the superior properties which are demonstrated by the compositions of this invention. Although the ultimate compositions of this invention are polyesters in a basic sense, the bulky nature of the polycyclic ring acts to sterically hinder any reaction or hydrolysis of the ester groups which would tend to degrade the coatings, thus imparting to the novel compositions of this invention excellent water and chemical resistance. Moreover, the fused polycarbocyclic ring also imparts a degree of hardness to the ultimate coatings not previously attainable with other coating formulations without sacrificing the flexibility and toughness of the coating. The preferred polycyclic hydroxy compounds contain from 2 to 4 carbocycles, having 5 to 6 carbon atoms in each carbocycle, such as for example, the following ring structures:

bicyclo[2.2.1]heptanoid

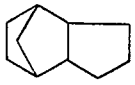

tricyclo[5.2.1.0$^{2,6}$]decanoid

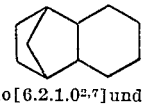

tricyclo[6.2.1.0$^{2,7}$]undecanoid

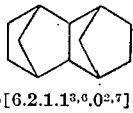

tetracyclo[6.2.1.1$^{3,0}$.0$^{2,7}$]dodecanoid

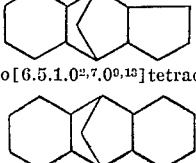

tetracyclo[6.5.1.0$^{2,7}$.0$^{9,13}$]tetradecanoid

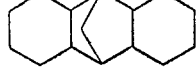

tetracyclo[6.6.1.0$^{2,7}$.0$^{9,14}$]pentadecanoid and the like. Highly preferred are those compounds having ring structures containing from 3 to 4 carbocycles, since in these compounds the aforementioned hindrance of subsequent reaction or decomposition of the coating is optimal.

It is pointed out that the vicinal epoxy substitution and the hydroxyl substitution of the polycyclic hydroxy compound takes place at non-bridgehead positions. Thus, for example, the 1 and 4 positions of a bicyclo[2.2.1]-heptanoid ring, would not be those substituted by either hydroxyl or vicinal epoxy groups, likewise, in a tricyclo-[5.2.1.0$^{2,6}$] decanoid, the 1,2,6 and 7 positions, being bridgehead positions would not carry the hydroxyl or vicinal epoxy substitutions. It is understood that the fused polycyclic hydroxy compounds of this invention can also be further substituted, preferably with alkyl groups, highly preferably, of 1 to 6 carbon atoms. Of course such alkyl substitution would also be preferably effected at other than bridgehead positions on the polycarbocyclic ring. In addition, in a particular preferred embodiment the above polycyclic hydroxy compounds useful in this invention are preferably not substituted on the methano carbon atom with other than hydrogen substitution.

Specific compounds which may be used in the compositions of the instant invention as the said polycyclic hydroxy compounds include the following. For example specific compounds having the characteristic bicyclo-[2.2.1]-heptanoid ring are:

3-oxatricyclo[3.2.1]octan-6-ol,
6-ethyl-3-oxatricyclo[3.2.1]octan-7-ol,
7-oxapropyl-3-oxatricyclo[3.2.1]octan-8-ol,
3-oxatricyclo[3.2.1]octan-6,7-diol,
3-oxatricyclo[3.2.1]octan-6,8-diol;
epoxy bicyclo[2.2.1]heptyl alkanols such as
3-oxatricyclo[3.2.1]octyl-6-butanol,
3-oxatricyclo[3.2.1]octyl-6-methanol,
6-hydroxymethyl-3-oxatricyclo[3.2.1]octan-5-ol The bicyclo[2.2.1]heptyl triols and higher, and which contain no epoxy groups, such as:

2-butyl-bicyclo[2.2.1]heptan-2,4,6-triol;
6-hydroxyethyl-bicyclo[2.2.1]heptan-2,3-diol;
2-butyl-bicyclo[2.2.1]heptan-2,3,5,6-tetraol;
3-methyl-8-hydroxyethyl-bicyclo[2.2.1]heptan-2,5-diol.

The oxypolyalkyleneoxyalkanols and oxyalkanols having the bicyclo[2.2.1]heptyl structure both containing and not containing epoxy groups such as:

3-oxatricyclo[3.2.1]oct-6-oxyethanol,
5-isopropyl-3-oxatricyclo[3.2.1]oct-6-oxytriethylene-
oxyethanol and the like.

Specific examples of suitable compounds having characteristic tricyclic structures such as the tricyclo-[5.2.1.0$^{2,6}$]decanoid and the tricyclo[6.2.1.0$^{2,7}$]undecanoid ring are the following:

4-oxatetracyclo[6.2.1.0$^{2,7}$.0$^{3,5}$]undecan-9-ol,
11-methyl-5-oxatetracyclo[7.2.1.0$^{2,8}$.0$^{4,6}$]dodecan-10-ol,
4-oxatetracyclo[6.2.1.0$^{2,8}$.0$^{4,6}$]undecan-9,10-diol,
4-oxatetracyclo[6.2.1.0$^{2,7}$.0$^{3,5}$]undecan-11-ol
5-oxatetracyclo[7.2.1.0$^{2,8}$.0$^{4,6}$]dodecan-9-oxyethanol
4-oxatetracyclo[6.2.1.0$^{2,7}$.0$^{3,5}$]undec-9-oxy-n-pentanol,
5-oxatetracyclo[7.2.1.0$^{2,8}$.0$^{4,6}$]dodec-9-oxy-n-butanol,
4-oxatetracyclo[6.2.1.0$^{2,7}$.0$^{3,5}$]undec-9-oxy-n-butanol,
5-oxatetracyclo[7.2.1.0$^{2,7}$.0$^{3,5}$]undec-9-oxy-t-butanol,
4-oxatetracyclo[6.2.1.0$^{2,7}$.0$^{3,5}$]undec-9-oxy-n-hexanol,
4-oxatetracyclo[6.2.1.0$^{2,7}$.0$^{3,5}$]undec-9-oxy-n-octanol,
5-oxatetracyclo[7.2.1.0$^{2,8}$.0$^{4,5}$]dodec-9-oxy-n-decanol, and the like.

Illustrative examples of the 4-oxatetracyclo[6.2.1.0$^{2,7}$.0$^{3,5}$]undec-9-oxyalkane - poly - ols and 5-oxatetracyclo-[7.2.1.0$^{2,8}$.0$^{3,5}$]undec-9-oxyalkane polyols which are contemplated include for instance, the oxyalkanediols, eg., the 4-oxatetracyclo[6.2.1.0$^{2,7}$.0$^{3,5}$]undec-9-oxypropane-
 diols,
the 5-oxatetracyclo[7.2.1.0$^{2,7}$.0$^{4,6}$]dodec-10-oxybutane-
 diols,
the 4-oxatetracyclo[6.2.1.0$^{2,7}$.0$^{3,5}$]undec-9-oxypentane-
 diols,
the 5-oxatetracyclo[7.2.1.0$^{2,8}$.0$^{4,6}$]dodec-10-oxyhexane-
 diols, and the like; the oxyalkanetriols, e.g., the 4-oxatetracyclo[6.2.1.0$^{2,7}$.0$^{3,5}$]undec-9-oxybutane-
 triols,
the 5-oxatetracyclo[7.2.1.0$^{2,8}$.0$^{4,6}$]dodec-11-oxypentane-
 triols,
the 4-oxatetracyclo[6.2.1.0$^{2,7}$.0$^{3,5}$]undec-9-oxyhexane-
 triols,
the 5-oxatetracyclo[7.2.1.0$^{2,8}$.0$^{4,6}$]dodec-10-oxyoctane-
 triols, and the like; the oxyalkanetetrols, e.g., the 4-oxatetra-cyclo[6.2.1.0$^{2,7}$.0$^{3,5}$]undec-9-oxyhexanetetrols; and the like; the 4-oxatetracyclo[6.2.1.0$^{2,7}$.0$^{3,5}$]undec-9-oxyalkanepentols; and the like.

Illustrative examples of non-epoxy-containing triols and higher having tricyclic ring structures such as the tricyclo[5.2.1.0$^{2,6}$]decyl and tricyclo[6.2.1.0$^{2,7}$]undecyl rings include tricyclo[5.2.1.0$^{2,6}$]decan-4,5,9-triol
tricyclo[5.2.1.0$^{2,6}$]decan-4,9,10-triol
tricyclo[6.2.1.0$^{2,7}$]undecan-4,9,10-triol
4,5-dihydroxy-tricyclo[5.2.1.0$^{2,6}$]decyl-9-ethanol
4,5-dihydroxytricyclo[6.2.1.0$^{2,7}$]undecyl-10-butanol
4,5-dihydroxytricyclo[5.2.1.0$^{2,6}$]dec-10-oxydiethyleneoxyethanol
4,5-dihydroxytricyclo[5.2.1.0$^{2,6}$]dec-9-oxybutanetriol
4,5-dihydroxytricyclo[6.2.1.0$^{2,7}$]undec-10-oxydipropyleneoxyethanol
4,5-dihydroxytricyclo[6.2.1.0$^{2,7}$]undec-10-oxyoctanediol and the like. It is understood that the useful compounds also include alkyl substituted derivatives of the above compounds particularly wherein the alkyl substitution is effected at non-bridgehead positions. Among the tricyclic compounds, those having the characteristic tricyclo[5.2.1.0$^{2,6}$]decanoid ring structure is preferred.

Specific examples of suitable compounds having characteristic tetracyclic structures such as the tetracyclo[6.2.1.1$^{3,6}$.0$^{2,7}$]dodecyl, tetracyclo[6.5.1.0$^{2,7}$.0$^{9,13}$]tetradecanoid, or tetracyclo[6.6.1.0$^{2,7}$.0$^{9,14}$]pentadecanoid or the like are for example:

10-oxypentacyclo[6.3.1.1$^{3,6}$.0$^{2,7}$.0$^{9,11}$]tridecan-4-ol,
4-ethyl-10-oxapentacyclo[6.3.1.1$^{3,6}$.0$^{2,7}$.0$^{9,11}$]tridecan-5-ol,
4-ethyl-10-oxapentacyclo[6.3.1.1$^{3,6}$.0$^{2,7}$.0$^{9,11}$]tridecan-4,5-diol,
5-oxapentacyclo[7.6.1.0$^{2,8}$.0$^{4,6}$.0$^{10,15}$]hexadecan-12-ol,
5-oxapentacyclo[6.6.1.0$^{2,7}$.0$^{4,6}$.0$^{9,14}$]pentadecan-11-ol,
5-oxapentacyclo[6.6.1.0$^{2,7}$.0$^{4,6}$.0$^{9,14}$]pentadecan-11,12-diol,
5-methyl-10-oxapentacyclo[6.2.1.1$^{3,6}$.0$^{2,7}$.0$^{9,11}$]tridec-4-ylmethanol
10-oxapentacyclo[6.3.1.1$^{3,6}$.0$^{2,7}$.0$^{9,11}$]tridec-4-ylmethanol,
5-oxapentacyclo[6.6.1.0$^{2,7}$.0$^{4,6}$.0$^{9,14}$]pentadec-11-ylethanol,
10-oxapentacyclo[6.3.1.1$^{3,6}$.0$^{2,7}$.0$^{9,11}$]tridec-4-yl-n-propanol,
5-oxapentacyclo[7.6.1.0$^{2,7}$.0$^{4,6}$.0$^{9,14}$]hexadec-12-ylisopropanol,
10-oxapentacyclo[6.3.1.1$^{3,6}$.0$^{2,7}$.0$^{9,11}$]tridec-4-yl-n-butanol,
10-oxapentacyclo[6.3.1.1$^{3,6}$.0$^{2,7}$.0$^{9,11}$]tridec-4-ylisobutanol,
5-oxapentacyclo[6.6.1.0$^{2,7}$.0$^{4,6}$.0$^{9,14}$]pentadec-11-yl-n-octan-2-ol,
10-oxapentacyclo[6.3.1.1$^{3,6}$.0$^{2,7}$.0$^{9,11}$]tridec-4-yl-n-decanol, and the like.

Among the oxyalkanols having basic tetracarbocyclic structures which are encompassed within the scope of the invention are, for example, 10-oxapentacyclo[6.3.1.1$^{3,6}$.0$^{2,7}$.0$^{9,11}$]tridec-4-oxy-n-pentanol,
5-oxapentacyclo[6.6.1.0$^{2,7}$.0$^{4,6}$.0$^{9,14}$]pentadec-11-oxyethanol,
5-oxapentacyclo[7.6.1.0$^{2,8}$.0$^{4,6}$.0$^{10,15}$]hexadec-12-oxy-n-propanol,
10-oxapentacyclo[6.3.1.1$^{3,6}$.0$^{2,7}$.0$^{9,11}$]tridec-4-oxyisopropanol,
10-oxapentacyclo[6.3.1.1$^{3,6}$.0$^{2,7}$.0$^{9,11}$]tridec-4-oxy-n-butanol,
5-oxapentacyclo[6.6.1.0$^{2,7}$.0$^{4,6}$.0$^{9,14}$]pentadec-11-oxyisobutanol,
5-oxapentacyclo[7.6.1.0$^{2,8}$.0$^{4,6}$.0$^{10,15}$]hexadec-12-oxy-t-butanol,
10-oxapentacyclo[6.3.1.1$^{3,6}$.0$^{2,7}$.0$^{9,11}$]tridec-4-oxy-n-hexanol,
5-oxapentacyclo[6.6.1.0$^{2,7}$.0$^{4,6}$.0$^{9,14}$]pentadec-11-oxy-n-octan-4-ol,
5-oxapentacyclo[7.6.1.0$^{2,8}$.0$^{4,6}$.0$^{10,15}$]hexadec-12-oxy-n-dodecanol, and the like.

Illustrative oxyalkane-poly-ols based on tetracarbocyclic structures are, for instance, the oxyalkane diols, e.g., the 10-oxapentacyclo[6.3.1.1$^{3,6}$.0$^{2,7}$.0$^{9,11}$]tridec-4-oxypropanediols,
the 5-oxapentacyclo[6.6.1.0$^{2,7}$.0$^{4,6}$.0$^{9,14}$]pentadec-11-oxybutanediols,
the 10-oxapentacyclo[6.3.1.1$^{3,6}$.0$^{2,7}$.0$^{9,11}$]tridec-4-oxypentanediols,
the 5-oxapentacyclo[7.6.1.0$^{2,8}$.0$^{4,6}$.0$^{10,15}$]hexadec-12-oxyhexanediols, and the like; the oxyalkanetriols, e.g.,
the 10-oxapentacyclo[6.3.1.1$^{3,6}$.0$^{2,7}$.0$^{9,11}$]tridec-4-oxybutanetriols,
the 5-oxapentacyclo[6.6.1.0$^{2,7}$.0$^{4,6}$.0$^{9,14}$]pentadec-11-oxypentanetriols,
the 10-oxapentacyclo[7.6.1.0$^{2,8}$.0$^{4,6}$.0$^{10,15}$]hexadec-12-oxyhexanetriols,
the 10-oxapentacyclo[6.3.1.1$^{3,6}$.0$^{2,7}$.0$^{9,11}$]tridec-4-oxyoctanetriols,
the 10-oxapentacyclo[6.3.1.1$^{3,6}$.0$^{2,7}$.0$^{9,11}$]tridec-4-oxynonanetriols, and the like; the oxyalkanetrols, e.g.,
the 10-oxapentacyclo-[6.3.1.1$^{3,6}$.0$^{2,7}$.0$^{9,11}$]tridec-4-oxyhexanetetrols,
and the like;
the 10-oxapentacyclo[6.3.1.1$^{3,6}$.0$^{2,7}$.0$^{9,11}$]tridec-4-oxyalkanepentols;

and the like.

Typical methyleneoxyalkanols having these tetracarbocyclic structures include, among others, 10-oxapentacyclo[6.3.1.1$^{3,6}$.0$^{2,7}$.0$^{9,11}$]tridec-4-ylmethyleneoxy-n-pentanol,
5-oxapentacyclo[6.6.1.0$^{2,7}$.0$^{4,6}$.0$^{9,14}$]pentadec-11-ylmethyleneoxyethanol,
10-oxapentacyclo[7.6.1.0$^{2,8}$.0$^{4,6}$.0$^{10,15}$]hexadec-12-ylmethyleneoxy-n-propanol,
10-oxapentacyclo[6.3.1.1$^{3,6}$.0$^{2,7}$.0$^{9,11}$]tridec-4-ylmethyleneoxyisopropanol,
10-oxapentacyclo[6.3.1.1$^{3,6}$.0$^{2,7}$.0$^{9,11}$]tridec-4-ylmethyleneoxy-n-butanol,
10-oxapentacyclo[6.3.1.1$^{3,6}$.0$^{2,7}$.0$^{9,11}$]tridec-4-ylmethyleneoxy-n-hexanol,
10-oxapentacyclo[6.3.1.1$^{3,6}$.0$^{2,7}$.0$^{9,11}$]tridec-4-ylmethyleneoxy-n-dodecanol, and the like.

Illustrative methyleneoxyalkane-poly-ols which are contemplated include, for instance, the 10-oxapentacyclo[6.3.1.1$^{3,6}$.0$^{2,7}$.0$^{9,11}$]tridec-4-ylmethyleneoxyalkanediols, e.g.,
the 10-oxapentacyclo[6.3.1.1$^{3,6}$.0$^{2,7}$.0$^{9,11}$]tridec-4-ylmethyleneoxypropanediols,
the 5-oxapentacyclo[6.6.1.0$^{2,7}$.0$^{4,6}$.0$^{9,14}$]pentadec-11-ylmethyleneoxybutanediols,
the 10-oxapentacyclo[7.6.1.0$^{2,8}$.0$^{4,6}$.0$^{10,15}$]tridec-12-methyleneoxypentanediols,
the 10-oxapentacyclo[6.3.1.1$^{3,6}$.0$^{2,7}$.0$^{9,11}$]tridec-4-ylmethyleneoxyhexanediols,
the 10-oxapentacyclo[6.3.1.1$^{3,6}$.0$^{2,7}$.0$^{9,11}$]tridec-4-ylmethyleneoxyoctanediols, and the like;
the methyleneoxyalkanetriols, e.g.,
the 10-oxapentacyclo[6.3.1.1$^{3,6}$.0$^{2,7}$.0$^{9,11}$]-tridec-4-yl methyleneoxybutanetriols,
the 5-oxapentacyclo[6.6.1.0$^{2,7}$.0$^{4,6}$.0$^{9,14}$]pentadec-11-ylmethyleneoxypentanetriols, the 10-oxapentacyclo[6.3.1.1$^{3,6}$.0$^{2,7}$.0$^{9,11}$]tridec-4-yl-methyleneoxyoctanetriols,
and the like; the methyleneoxyalkanetetrols, e.g.,
the 10-oxapentacyclo[6.3.1.1$^{3,6}$.0$^{2,7}$.0$^{9,11}$]tridec-4-yl-methyleneoxyhexanetetrols,
and the like;
the 10-oxapentacyclo[6.3.1.1$^{3,6}$.0$^{2,7}$.0$^{9,11}$]tridec-4-yl-methyleneoxyalkanepentols;

and the like.

The 10-oxapentacyclo[6.3.1.1$^{3,6}$.0$^{2,7}$.0$^{9,11}$]tridec-4,5-ylene-dialkanols are exemplified, preferably, by such compounds as 10-oxapentacyclo[6.3.1.1$^{3,6}$.0$^{2,7}$.0$^{9,11}$]tridec-4,5-ylene-dimethanol, 10-oxapentacyclo[6.3.1.1$^{3,6}$.0$^{2,7}$.0$^{9,11}$]-tridec-4,5-ylene-diethanol, and the like.

Illustrative examples of non-epoxy-containing triols and higher having the tetracyclic ring structures such as the tetracyclo[6.2.1.1$^{3,6}$.0$^{2,7}$]dodecanoid, tetracyclo[6.5.1.0$^{2,7}$.0$^{9,13}$]tetradecanoid, tetracyclo[6.6.1.0$^{2,7}$.0$^{9,14}$]-pentadecanoid rings and the like include, tetracyclo[6.2.1.1$^{3,6}$.0$^{2,7}$]dodecan-4,5,9-triol,
tetracyclo[6.6.1.0$^{2,7}$.0$^{9,14}$]pentadecan-4,5,11-triol,
tetracyclo[6.5.1.0$^{2,7}$.0$^{9,13}$]tetradecane-4,5,11-triol,
4,5-dihydroxytetracyclo[6.2.1.1$^{3,6}$.0$^{2,7}$]dodecyl-9-methanol,
4,5-dihydroxytetracyclo[6.2.1.1$^{3,6}$.0$^{2,7}$]dodecyl-9-butanetriol,
4,5-dihydroxytetracyclo[6.2.1.1$^{3,6}$.0$^{2,7}$]dodecyl-9-oxybutanediol,
11-hydroxytetracyclo[6.6.1.0$^{2,7}$.0$^{9,14}$]pentadecyl-4,5-dimethanol,
4,5-dihydroxytetracyclo[6.5.1.0$^{2,7}$.0$^{9,13}$]tetradecyl-11-hexanetriol,
4,5-dihydroxy[6.2.1.1$^{3,6}$.0$^{2,7}$]dodecan-9-oxytri(ethyleneoxy)ethanol, and the like. It is understood that the useful compounds also include alkyl substituted derivatives of the above compounds, particularly wherein the alkyl substitution is effected by nonbridgehead positions. Among the tetracyclic compounds, those having the characteristic tetracyclo[6.2.1.1$^{3,6}$.0$^{2,7}$]dodecyl ring are preferred.

Further illustrative of useful polycyclic hydroxy compounds having even five and six carbocycles in the basic ring structure are the following 11-oxahexacyclo[6.6.1.1$^{3,6}$.0$^{2,7}$.0$^{9,14}$.0$^{10,12}$]hexadecan-4-ol,
11-oxahexacyclo[6.6.1.1$^{3,6}$.0$^{2,7}$.0$^{9,14}$.0$^{10,12}$]hexadecan-4-butanediol,
5-oxahexacyclo[7.6.1.1$^{11,14}$.0$^{2,8}$.0$^{4,6}$.0$^{10,15}$]heptadec-12-oxyethanol,
5-oxahexacyclo[7.6.1.1$^{11,14}$.0$^{2,8}$.0$^{4,6}$.0$^{10,15}$]heptadec-12-oxybutanediol,
pentacyclo[10.2.1.1$^{5,8}$.0$^{2,11}$.0$^{4,9}$]hexadecan-6,7,13-triol,
5-oxaheptacyclo[7.6.1.1$^{3,7}$.1$^{11,14}$.0$^{2,8}$.0$^{4,6}$.0$^{10,15}$]octadecan-12-ol,
5-oxaheptacyclo[7.6.1.1$^{3,7}$.1$^{11,14}$.0$^{2,8}$.0$^{4,6}$.0$^{10,15}$]octadecan-12-oxyethanol, and the like. It is again pointed out that alkyl substituted derivatives of these compounds are also included particularly when the alkyl substitution is effected at a non-bridgehead position Illustrative of the diepoxy polycyclic compounds which are useful in the compositions of the instant invention are preferably those containing tricarbocyclic and tetracarbocyclic ring structures such as:

5,10-dioxapentacyclo[6.3.1.0$^{2,7}$.0$^{4,5}$.0$^{9,11}$]dodecane
5,11-dioxapentacyclo[7.3.1.0$^{2,8}$.0$^{4,6}$.0$^{10,12}$]tridecane
5,11-dioxahexacyclo[7.3.1.1$^{3,7}$.0$^{2,8}$.0$^{4,6}$.0$^{10,12}$]tetradecane
5,12-dioxahexacyclo[7.6.1.0$^{2,8}$.0$^{4,6}$.0$^{10,15}$.0$^{11,13}$]hexadecane
5,13-dioxahexacyclo[7.7.1.0$^{2,8}$.0$^{4,6}$.0$^{10,16}$.0$^{12,14}$]heptadecane and the like as well as higher polycyclic diepoxides such as 5,13 - dioxaoctacycle[7.7.1.1$^{3,7}$.1$^{11,15}$.0$^{2,8}$.0$^{4,6}$.0$^{10,16}$.0$^{12,14}$]nonadecane and the like. Highly preferred is 5,10-dioxapentacycle [6.3.1.0$^{2,7}$.0$^{4,6}$.0$^{9,11}$]dodecane, i.e., dicyclopentadiene dioxide It is understood that alkyl substituted derivatives of these compounds are also contemplated particularly when the alkyl substitution is effected at non-bridgehead positions.

The preparation of the polycyclic hydroxy compounds above will be discussed hereinafter.

The polycyclic hydroxy compounds described above are the first component used in forming the polyester portion of the novel adduct of this invention. Of course a combination of two or more of the above polycyclic hydroxy compounds may be employed. For example, often a monopoxy alcohol and the "hydrated" polyhydroxy derivative are used to prepare a single polyester. These polycyclic hydroxy compounds are reacted with an unsaturated fatty acid or oil and a polycarboxylic acid or anhydride to form the polyester. Subsequently an α,β-unsaturated diacid is adducted to the polyester so produced to yield the desired polyester-carboxylic acid adduct useful in the compositions of this invention.

Accordingly, the second component used in preparing the polyester portion of the novel adduct of this invention is an unsaturated fatty acid or oil. Preferred are long chain polyunsaturated monocarboxylic acids. Suitable olefinic fatty acids include those containing up to 22 carbon atoms such as 2-butenoic acid, 3-pentenoic acid, 2-hexenoic acid, 2,4-hexendioic acid, 4-octenoic acid, 2,4-decadienoic acid, stillingic acid, Δ$^9$-dodecylenic acid, petroselinic acid, vaccenic acid, linoleic acid, palmitoleic acid, linolenic acid, eleostearic acid, punicic acid, licanic acid, arachidonic acid, cetoleic acid and the like. It is advantageous for purposes of economy to employ mixtures of acids, particularly those derived from natural sources such as dehydrated castor oil, cottonseed oil, linseed oil, oiticica oil, perilla oil, olive oil, safflower oil, sardine oil, soybean oil, tall oil, tung oil (Chinawood oil), and the like. In general, acids or oils having an acid number in excess of about 100 are preferred.

Mixtures of acids may of course be employed. In addition, if desired, long chain saturated fatty acids may be employed in small amounts, e.g., valeric acid, caproic acid, myristic acid, capric acid, palmitic acid, stearic acid, lauric acid (coconut oil acids) and the like. The use of such acids, however, will deplete the number of sites at which the adduction of the α,β-unsaturated acid can occur. Regulation of this can become a factor in regulating the water compatibility of the ultimate compositions, as will become obvious to the skilled artisan following a complete consideration of the teachings herein.

Also the use of short chain α,β-unsaturated acids as the unsaturated fatty acid component is not preferred since these compounds tend to autopolymerize. Such compounds as acrylic acid, methacrylic acid, tigelic acid, and the like accordingly are not preferred as the unsaturated fatty acid in compositions of this invention.

It is pointed out that when a monoepoxide or diepoxide is employed as the polycyclic hydroxy compound in preparation of the polyester portion of the novel polyester carboxylic acid adduct it is preferred to utilize unsaturated fatty acid or a mixture of the above which contains at least a portion of an olefinic fatty acid in preference to the corresponding oil or triglyceride. When however, the polycyclic hydroxy compound is free from epoxy groups, the use of an oil rather than the acid results in an ester interchange and effects the desired esterification without producing water of esterification. However, there is no disadvantage to such water formation since it will not adversely effect the composition, and actually since the esterification is carried out at moderately elevated temperatures, this water is usually vaporized as it is formed.

In addition to the polycyclic hydroxy compound and the fatty acid, the third component employed in preparing the polyester portion of the novel polyester-carboxylic acid adduct of this invention is a polyfunctional acid or anhydride. Suitable compounds include saturated and unsaturated aliphatic, alicyclic and aromatic acids containing at least two carboxy groups per molecule and their corresponding anhydrides. Mixture of acids may also be employed.

It is pointed out however that α,β-unsaturated dicarboxylic acids, e.g., maleic acid, itaconic acid and the like, by virtue of the reactivity of the ethylenic double bond, tend to enter other reactions, e.g., "ene" polymerizations, Diels Alder additions, and the like, other than the desired esterification. Accordingly the polycarboxylic component should compose a major amount, i.e., 50 percent or more on a carboxyl equivalent basis, of an acid free from ethylenic unsaturation at either of the positions alpha-beta to either of the carbonyl carbon atoms. Preferably, 75 percent of the polycarboxylic component, on carboxyl equivalents, is comprised of a dicarboxylic acid or anhydride free of ethylenic unsaturation at either of the positions alpha-beta to the carbonyl carbon atoms.

Representative polycarboxylic acids include oxalic acid, malonic acid, succinic acid, glutaric acid, adipic acid, pimelic acid, suberic acid, azelaic acid, sebacic acid, alkylsuccinic acids, alkenylsuccinic acids, ethylbenzylsuccinic acid, maleic acid, fumaric acid, itaconic acid, citraconic acid, mesaconic acid, glutaconic acid, ethylidenemalonic acid, alphahydromuconic acid, beta-hydromuconic acid, diglycollic acid, dilactic acid, thiodiglycollic acid, 4-amyl-2,5-heptadienedioic acid, 3-hexynedoic acid, 1,2 - cyclohexanedicarboxylic acid, 1,4-cyclohexanedicarboxylic acid, 2-carboxy-2-methyl-cyclohexaneacetic acid, phthalic acid, isophthalic acid, terephthalic acid, tetrahydrophthalic acid, tetrachlorophthalic acid, 1,8-napthalene-dicarboxylic acid, 3-carboxycinnamic acid, 1,2-napthalene-dicarboxylic acid, 1,1,5-pentanetricarboxylic acid, 1,2 - naphthalenedicarboxylic acid, 1,1,5-pentanetricarboxylic acid, 1,2,4-hexanetricarboxylic acid, 2-propyl-1,2,4-pentanetricarboxylic acid, 5-octene-3,3,6-tricarboxylic acid, 1,2,3-propanetricarboxylic acid, 1,2,4-benzenetricarboxylic acid, 3-hexene-2,2,3,4-tetracarboxylic acid, 1,2,3,4-benzenetetracarboxylic acid, benzenehexacarboxylic acid, polymerized fatty acids derived from natural oils, e.g., linseed oil, tung oil, soybean oil, dehydrated castor oil, etc., including mixtures thereof, which have a molecular weight within the range of 500 to 5000, and the like, such as the dimer and trimer acids of commerce.

Also, as polycarboxylic acids useful in the novel coating compositions there are included compounds containing ester groups in addition to two or more carboxy groups which can be termed polycarboxy polyesters of polycarboxylic acids, such as those listed above, or the corresponding anhydrides of said acids, esterified with polyhydric alcohols. Stated in other words, by the term "polycarboxy polyesters," as used herein, is meant polyesters containing two or more carboxy groups per molecule. These polycarboxy polyesters can be prepared by known condensation procedures, employing mole ratios favoring greater than equivalent amounts of polycarboxylic acid, or anhydride.

A particular class of polycarboxy polyesters which can be employed in the compositions of this invention are the "hindered" polycarboxy polyesters derived from a dicarboxylic acid or anhydride such as those above, and a polyol having a bulky polycarbocyclic ring which can sterically shield the ester linkages formed. Polyols such as the bicyclo[2.2.1]heptane diols and the like are preferred.

Typical polycarboxylic acid anhydrides include succinic anhydride, glutaric anhydride, propylsuccinic anhydride, methylbutylsuccinic anhydride, hexylsuccinic anhydride, heptylsuccinic anhydride, pentenylsuccinic anhydride, octenylsuccinic anhydride, nonenylsuccinic anhydride, alpha, beta-diethylsuccinic anhydride, maleic anhydride, chloromaleic anhydride, dichloromaleic anhydride, itaconic anhydride, citraconic anhydride, hexahydrophthalic anhydride, hexachlorophthalic anhydride, tetrahydrophthalic anhydride, methyltetrahydrophthalic anhydride, tetrachlorophthalic anhydride; hexachloroendomethylenetetrahydrophthalic anhydride, otherwise known as chlorendic anhydride, tetrabromophthalic anhydride, tetraiodophthalic anhydride; phthalic anhydride, 4-nitrophthalic anhydride, 1,2-naphthalic anhydride; polymeric dicarboxylic acid anhydrides, or mixed polymeric dicarboxylic acid anhydrides such as those prepared by the autocondensation of dicarboxylic acids, for example, adipic acid, pimelic acid, sebacic acid, hexahydroisophthalic acid, terephthalic acid, isophthalic acid and the like. Also, other dicarboxylic acid anhydrides, useful in the coating compositions include the Diels-Alder adducts of maleic acid and alicyclic compounds having conjugated double bonds, e.g., methylbicyclo-[2.2.1]-hepten-2,3-dicarboxylic anhydride.

In practice it has been found that the preferred third component of the coating compositions of this invention is tetrahydrophthalic acid or anhydride or a mixture containing a major amount of phthalic acid or anhydride and a minor amount of maleic anhydride. These reactants produce resins which possess good color, excellent solubility characteristics and coating properties as hereinafter indicated. In general, in the latter case the ratio of phthalic anhydride to maleic anhydric should be at least about 2:1 and more preferably from about 2:1 to about 10:1.

In its broad aspect, the novel compositions of this invention are prepared from the hereinbefore described reactants, by techniques which are analogous to those employed in alkyd resin production and are well known to the art. Thus, for example, where a mixture of monobasic and polybasic reactants is employed, i.e., the unsaturated fatty acid and polycarboxylic acid or anhydride the monobasic reactant can be dissolved in the polybasic reactant and the solution reacted with the polycyclic hydroxy compound at elevated temperatures and in the presence of a catalyst if desired. In a preferred procedure, all components are charged to a reaction vessel along with a catalyst and a high boiling organic solvent, the admixture is heated at a temperature and for a period of time sufficient for the removal of water of esterification and completion of the reaction.

As will be apparent hereinafter to those skilled in the art, the particular polycyclic hydroxy compound, unsaturated fatty acid and polycarboxylic acid or anhydride employed to prepare the alkyd resin depend upon the characteristics desired in the final product. For example, varying the polycarboxylic acid or anhydride will impart certain characteristic coating properties such as increased or decreased hardness, resistance to certain chemicals and the like.

It is preferred in producing the polyesters used to form the novel adducts of this invention to esterify all or substantially all of the hydroxyl groups or epoxy groups of the polycyclic hydroxy compound. The reason for this will become apparent upon discussion of the adduction of an α,β-unsaturated dicarboxylic acid or anhydride to the polyester which will be elaborated upon hereinafter. Accordingly, the total carboxyl content of the monocarboxylic fatty acid and the polycarboxylic acid and/or anhydride should be preferably substantially stoichiometrically equivalent to the total hydroxyl content (as both hydroxyl groups and cyclic vicinal epoxy groups) of the polycyclic hydroxy compound. Generally, at least about 0.9 equivalent of carboxyl groups per hydroxyl equivalent is employed. It is suitable to employ from about 0.9 to about 1.2 or preferably to 1.1 carboxyl equivalents per hydroxyl equivalent in making the polyester, though additional carboxyl may be added to the ester as hereinafter provided.

Since this preferred ratio of carboxyl to hydroxyl equivalents is substantially one, it will be apparent that the chain length or degree of polymerization will depend upon the relative amount of carboxyl content which exists in the form of polyfunctional as opposed to monofunctional acids. The former being polyfunctional may be termed a chain propagator, while the latter being monofunctional may be termed a chain terminator. It is obvious that if the entire equivalency of carboxyl groups is in the form of a polycarboxylic acid or anhydride, that upon complete esterification a highly crosslinked gelled or solid polyester would result which would obviously be useless as a coatings vehicle. With the systems of the instant invention it has been found that if a difunctional carboxylic acid and a monofunctional fatty acid are completely reacted with a trifunctional polycyclic hydroxy compound in an approximate COOH/OH ratio of about one, sufficient crosslinking to cause gelling will usually occur if more than 75 percent of the carboxyl groups are furnished by the difunctional acid or anhydride (the remainder being furnished by the monofunctional fatty acid component). As the number of reactive sites on both the polycarboxylic acid or anhydride and on the polycyclic hydroxy compound increases, a greater relative proportion of the reactive carboxyl groups are preferably furnished by the chain terminating monocarboxylic fatty acid to prevent excessive crosslinking and consequent gelling. If a tetrafunctional carboxylic acid anhydride is employed together with a trifunctional polyhydroxy compound, in a COOH/OH ratio of about one gelling will usually occur upon complete esterification when more than about 45 to 50 percent of the carboxyl groups are in the form of a tetrafunctional carboxylic acid or anhydride. As a further example, with a tetrafunctional carboxylic acid or anhydride and a tetrafunctional polycyclic hydroxy compound, the totally reacted ester having a COOH/OH ratio of about one will gel when only about 35 percent of the carboxyl groups are in the form of polycarboxylic acid or anhydride. In each case the remainder of the carboxyl groups needed to provide the 1:1 ratio of carboxyl to hydroxyl equivalents will be made up by the monocarboxylic acid which by virtue of its monofunctionality will not tend to crosslink the polyester.

It is also obvious that a minimum amount of polymerization must occur in the formation of the polyester to enable production of a coating having acceptable film forming properties. Thus, there must be a minimal amount of chain propagating polycarboxylic acid or anhydride. This amount again will depend upon the functionality of both the polycarboxylic acid or anhydride and of the polycyclic hydroxy compound. Thus when employing a difunctional carboxylic acid or anhydride and a trifunctional polycyclic hydroxy compound so as to provide a COOH/OH ratio of about one at least about 35 to 40 percent of the carboxyl groups should exist in the difunctional carboxylic acid or anhydride (the remainder being furnished by the monocarboxylic fatty acid component) to form a suitable ester for coatings. When both the polycyclic hydroxy compound and the polycarboxylic acid or anhydride are tetrafunctional, the percentage of carboxyl groups in the polyfunctional carboxylic acid or anhydride may be as low as about 20 percent. With components of higher functionality the amount of the carboxyl groups furnished by the polyfunctional carboxylic acid or anhydride may be as low as 10 percent.

Thus, in the preparation of the polyester portion of the polyester carboxylic acid adduct of this invention the carboxyl groups are furnished by polycarboxylic acids and anhydrides (COOHp) and by monocarboxylic fatty acids (COOHm). The above overall broad ratio of carboxyl to hydroxyl groups may be accordingly expressed $$\frac{COOHp+COOHm}{OH} > 0.9 \text{ or } \frac{COOHp}{OH} + \frac{COOHm}{OH} > 0.9$$

Moreover, to insure film forming and to prevent gellation the limits of COOHp/OH are about as follows:

$$0.1 < \frac{COOHp}{OH} < 0.75$$

Highly suitable and commercially attractive coatings may be made from polyesters prepared employing the COOHp/OH ranges set forth in Table A below. In the table, $N_{COOH}$ represents the functionality of the polycarboxylic acid or anhydride and $N_{OH}$ represents the functionality of the polycyclic hydroxy compound, and accordingly the COOHp/OH range, set forth in the form of a maximum and a minimum are given in terms of the functionality of both of these components. For these preferred formulations the overall carboxyl to hydroxyl ratio is about one, i.e.

$$\frac{COOHp+COOHm}{OH} = \text{about one}$$

The $N_{OH}$ value of 3.2 is the actual functionality of a preferred polycyclic hydroxy compound, i.e., 4-oxa-tricyclo[6.2.1.0$^{2,7}$.0$^{3,5}$]undecan-9-(10)-ol

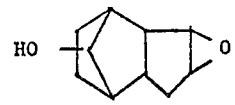

Although the theoretical equivalency is clearly 3.0, a small amount of dimerization of the compound through the alcoholic hydroxy groups gives the compound an actual equivalency of 3.2.

TABLE A

| $N_{OH}$ | | $N_{COOH}$ | | |
|---|---|---|---|---|
| | | 2 | 3 | 4 |
| 3 | Min | .46 | .35 | .31 |
| | Max | .65 | .49 | .43 |
| 3.2 | Min | .43 | .32 | .29 |
| | Max | .61 | .45 | .40 |
| 4 | Min | .35 | .26 | .23 |
| | Max | .49 | .36 | .32 |
| 5 | Min | .28 | .21 | .19 |
| | Max | .39 | .29 | .26 |

By extrapolation of these teachings, e.g., by experimental laboratory techniques, suitable COOHp/OH values may be developed for a broad spectrum of coatings compositions to obtain different properties, as will be obvious to the artisan skilled in the alkyd resin art.

Although in preparation of the polyester it is preferred to react the polycyclic hydroxy compound, the polycarboxylic acid or anhydride and the fatty acid so as to provide an overall COOH/OH ratio of about one, following the esterification reaction it is preferred to add excess carboxyl groups by adding to the polyester additional fatty acid. This excess fatty acid is added after the esterification since the presence of an undue amount of such chain terminating carboxyl groups in the esterifications will sometimes tend to hinder chain propagation. Thus, although under certain circumstances it may be possible to add the excess fatty acid originally it is preferred, for ease of formulation, that the esterification be completed first. Preferably the excess of caboxyl groups in the form of fatty acid which are added is up to about 25 percent based on the original hydroxyl content of the polyester. Highly preferred coatings may be formulated using a basic polyester produced by reacting the polycyclic hydroxy compound, a polycarboxylic acid or anhydride and the fatty acid in an overall COOH/OH ratio of about one and using a COOHp/OH value as in the above table and subsequently adding up to 20 percent excess of carboxyl group in the form of additional fatty acid.

In a highly preferred embodiment of this invention useful coating compositions which surpass many of the commercially available alkyd resins, are obtained by a careful control of the concentration of hydrolyzable and/ or water sensitive groups in the polyester portion of the coating composition. It has been found that the frequency of these groups is an important factor in the overall water and alkali-resistance of the polymeric product. While the sensitivity caused by hydroxyl, ethers, and acids to water is greater than esters, only the ester group is hydrolyzable with alkali and hence the net effect of all appear to be about the same regardless of type when the overall chemical properties of the coating are considered. As pointed out above, the excellent stability and chemical and water resistance of the compositions of the instant invention appears in part to be due to a protective steric hindrance of the ester groups caused by the bulky polycarbocyclic ring of the polycyclic hydroxy compounds. Nevertheless, an excessive concentration of ester, hydroxyl, acid or ether groups in the polyester results in early failure of the coating when exposed to aqueous, particularly alkaline, environmental conditions. The percent oxygen has been used as a practical measure of the concentration of the aforesaid groups. It has been found that the polyesters having an oxygen content (including the oxygen of the added excess fatty acid) of up to 20 weight percent and more preferably up to 18 weight percent, have excellent chemical and water resistance. Generally the polyesters have an oxygen content of greater than 10 or 12 percent. The aforesaid oxygen fraction of the compositions of course does not include any oxygen absorbed from the air during the cure of the coatings. In some instances this may be as high as an additional 10-12 percent.

Catalysts which have been found suitable for use in the foresaid reaction to produce the polyester include among others the tetraalkyl titanates, e.g., tetraethyl titanate, tetraisopropyl titanate, tetrabutyl titanate, and the like, also are contemplated. Basic catalysts can also be employed. Illustrative basic catalysts include for instance, alkali metal catalysts, e.g., sodium hydroxide, potassium hydroxide, lithium acetate, calcium naphthenate and the like; the amines, e.g., alpha-methylbenzyldimethylamine, dimethylethylamine, triethylamine, tripropylamine, trimethylammonium hydroxide, and the like.

The concentration of the catalyst can range from about 0.01 and lower, to about 10.0, and higher, weight percent, based on the total weight of reactants.

Suitable vehicles in which the esterification reaction can be conducted include normally liquid organic compounds in which the reactants are at least partially soluble and which are inert to the components of the formulation. Typical solvents include, for instance, the aromatic hydrocarbons, e.g., benzene, toluene, xylene, ethylbenzene, and the like; the saturated aliphatic and cycloaliphatic hydrocarbons, e.g., hexane, heptane, cyclopentane, cyclohexane, lower alkyl substituted-cyclohexane, and the like; the oxygenated organic compounds, e.g., acetone, methyl ethyl ketone, methyl isobutyl ketone, cyclohexanone, tetrahydrofuran, dioxane, and the like. The aromatic hydrocarbons are preferred.

The esterification reaction can be conducted at an elevated temperature, for example, a temperature at least about 75° C. and even lower. A suitable temperature range is from about 150° C. to about 300° C., and higher, and preferably, from about 150° C. to about 250° C. The reaction period can vary from several minutes to several days depending, of course, on factors such as the reaction temperature, the concentrations and reactivities of the reactants, the presence or absence of a catalyst, and the like. In general, a reaction period of from about 0.5 to about 24 hours is suitable. Water resulting from the esterification reaction will be vaporized if the reaction is conducted at temperatures over 100° C. or can be removed by methods well known to the art.

Degree of esterification may be effectively measured by determining the acid number of the polyester. Acid number is defined as the number of milligrams of potassium hydroxide required to neutralize the free acid in a gram of the polyester. Upon completion of the reaction the polyesters useful in the ultimate novel compositions of this invention possess an acid number less than 20, preferably less than 18. An acid number below about 14 indicates virtually complete esterification and polyesters having acid numbers in this range are highly desirable. Of course the minimal achievable acid number will depend upon the original overall COOH/OH ratio in the initial charge as well as upon the reactivity of the reactants. To test the progress of the reaction, acid numbers of the reaction mixture may be taken periodically, and the heating should be maintained until the acid number has reached a value less than 20 and preferably until the acid number readings have reached a constant minimum.

The esterification is preferably conducted in the presence of a non-oxidizing atmosphere. Oxidation of the reactants by air at the elevated temperatures causes formation of color bodies in the polyester and can lead to imminent gelation. Accordingly the esterification is preferably conducted in a closed container under a nitrogen atmosphere or in an open kettle blanketed with a heavy non-oxidizing gas such as carbon dioxide.

If desired, the resulting esterified product can be recovered from the inert normally liquid organic solvent (if one is employed) by various well known expediencies. The product can also be recovered from solution by heating to drive off the organic solvent.

The addition of the excess fatty acid is made preferably following the esterification. The addition may be made at the esterification temperature or following a cooling of the esterification product mixture.

The novel polyester-carboxylic acid adducts are then prepared by adducting to the polyester, or polyester mixture with excess monocarboxylic acid, of a polycarboxylic acid in such a manner as to preserve the carboxyl groups of the said polycarboxylic acid unreacted. Accordingly it is preferred to use polycarboxylic acid which readily will enter other reactions such as vinyl polymerization, "ene" polymerization, Diels Alder addition or the like. Suitably, therefore, the adduction is effected with a polycarboxylic acid or anhydride which is ethylenically unsaturated in a position which is alpha-beta to any of the carbonyl carbon atoms since these compounds have active double bonds. $\alpha,\beta$ - Unsaturated polycarboxylic compounds which are useful in preparing the polyester carboxylic acid adducts include the following acids and their anhydrides: maleic acid, maleic anhydride, fumaric acid, itaconic acid, itaconic anhydride, glutaconic acid, citraconic acid, citraconic anhydride, mesaconic acid, the alkylidene malonic acids such as ethylidenemalonic acid, propylidene malonic acid, butylidene malonic acid and the like, $\alpha$-hydromuconic acids, the dialkyl maleic acids such as dimethyl maleic acid (pyrocinchonic acid), diethyl maleic acid (xeronic acid), dipropyl maleic acid, dibutyl maleic acid and the like, 1,6-hex-2-enedioic acid, 1,6-hexa-2,4 - dienedioic acid, and the like. Preferred are acyclic dicarboxylic acids and anhydrides containing up to 10 carbon atoms. Hereinafter when reference is made to these $\alpha,\beta$-ethylenically unsaturated acids used in the adduction, this will be deemed to include the corresponding anhydride.

The adduction of the $\alpha,\beta$-unsaturated acid is achieved by adding the $\alpha,\beta$-unsaturated acid to the polyester containing the excess fatty acid, if it has been added. The adduction takes place through the double bond of the acid leaving the carboxy groups of the acid unreacted. Accordingly it can be seen why it was preferable to react all the hydroxyl groups and vicinal epoxy groups of the polycyclic hydroxy compound, since unreacted hydroxyl groups will react with the carboxyl groups of the $\alpha,\beta$-unsaturated dicarboxylic acid added during the instant adduction.

It is desirable to add sufficient $\alpha,\beta$-unsaturated dicarboxylic acid to raise the acid number of the adduct to at least about 35. Suitable polyester-carboxylic adducts have acid numbers in the range of from about 40 to about 120.

Generally these acid numbers in this range can be achieved by adding up to about 15 percent on an equivalent basis of the α,β-unsaturated dicarboxylic acid based upon the hydroxyl equivalency of the original polycyclic compound. However, acid number range is the more important criteria in preparing the adduct.

It is apparent that the addition of an overly excessive amount of dicarboxylic acid will adversely affect the ultimate coating compositions by virtue of the high proportions of oxygen present in the dicarboxylic acid. In addition it should be mentioned that addition of maleic acid to an already high molecular weight polyester can at times cause gelation of the polyester carboxylic acid adduct. It is in the instance where the polyester is already of a high molecular weight and consequently gelation resulting from crosslinking by the α,β-unsaturated dicarboxylic acid is likely, that an excess of monocarboxylic acid is desirable. The presence of excess monocarboxylic fatty acid permits addition of sufficient α,β-unsaturated dicarboxylic acid to bring the acid number above the minimal value of about 35.

The adduction reaction is conducted at a temperature of about 175 to 250° C. by simply mixing the reactants. The addition of iodine in small catalytic amounts preferably about .005 to about .5 percent by weight based on both the polyester and the α,β-unsaturated dicarboxylic acid facilitates the adduction of the α,β-unsaturated dicarboxylic acid by vinyl polymerization, "ene" polymerization, Diels Alder addition, and the like. The addition of iodine may conveniently be accomplished by first dissolving the iodine in an inert solvent such as xylene.

Often the addition of the α,β-unsaturated dicarboxylic acid to the polyester causes development of considerable color in the adduct. It has been found that the development of color can be inhibited by addition of a phosphite stabilizer to the reaction mixture. Suitable phosphite stabilizers include triisoctyl phosphite, tributyl phosphite, tripropylene glycol phosphite, diphenyl isodecyl phosphite, diphenyl pentaerythritol diphosphite and the like. These phosphite stabilizers are usually added in small amounts sufficient to inhibit the development of color. Satisfactory color inhibition has been obtained by use of up to about 1 percent of the phosphite stabilizer generally from about 0.01 to about 1 percent based on the weight of both the polyester and the α,β-unsaturated dicarboxylic acid.

Novel water compatible adducts are then prepared from the polyester-carboxylic acid adducts having pendant carboxyl groups by modifying these pendant carboxyl groups with a water soluble cation to create a hydrophilic carboxylic acid salt. Thus, it is necessary in the adduction step to preserve as many of the carboxyl groups of the α,β-unsaturated dicarboxylic acid in the unreacted state, since these serve as the sites for introduction of hydrophiles in this "water solubilization" step.

One method of "water solubilization," i.e., of rendering the adducts water compatible, is by creating the quaternary ammonium salts by the reaction of the pendant carboxyl groups with ammonia or an amine under aqueous conditions. These quaternary salts furnish a multiplicity of hydrophilic sites in the polymer itself to render the polyester carboxylic adduct water compatible if not water soluble. By water compatibility is meant that the adduct, although not miscible with water in all proportions, can be solubilized in a mixture of water and a cosolvent to provide a solution containing approximately 40 percent resin solids, and may thereafter be diluted down with water to a solution containing 5 percent resin solids.

The quaternary ammonium salt of the polyester-carboxylic acid adduct is produced by reacting the free carboxyl groups of the adduct with an aqueous solution of a compound such as ammonia or an amine under aqueous conditions. Following the water solubilization with ammonia or amine the desired polyester-carboxylic acid adduct would therefore have pendant hydrophilic quaternary groups of the structure:

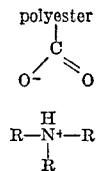

wherein each R represents hydrogen, an organic radical or in the case of cyclic amines two R substituents taken together may form an alkylene or heteroalkylene chain.

Suitable amines are water soluble primary secondary and tertiary amines which will produce the desired hydrophilic quaternary ammonium group. The amines may be otherwise substituted so long as the substituents do not adversely react with any of the components in the system. Accordingly, alkanolamines, dialkanolamines and the like are suitable since they are for the most part water soluble and since the hydroxyl substituent will not tend to form an ester with the free carboxyl groups in the aqueous medium.

The hydrophilic quaternary ammonium groups lend water compatibility to the polyester-carboxylic acid adducts of this invention. However, when the ultimate coating composition is applied, the amine evaporates during the drying process thus leaving a water insoluble resin film as the coating. Thus it is obvious that for an air drying coating the amines to be employed must have vapor pressures sufficiently high to permit drying of the coating within a reasonable period of time. For such air drying coatings desirable amines are those which possess a boiling point of less than about 180° C. at 760 millimeters of mercury pressure. Highly suitable are amines boiling below about 180° C. Of course if a heat curable coating is desired, obviously the vapor pressure of the amine would be immaterial and it would be necessary only to employ an amine having a boiling point lower than the boiling point or the char point of the resin which forms the coating.

Compounds which are suitable for reaction with the carboxyl groups to produce a hydrophilic quaternary ammonium group include ammonia, amines such as the primary, secondary and tertiary amines, including alkanolamines, polyamines such as diamines and triamines, cyclic amines such as the morpholines, piperazines and the like which are water soluble, and in the case where employed for air drying coatings, which will produce a coating which will dry within a reasonable period of time.

Typical amines are primary alkyl amines such as ethylamine, diethyl amine, propyl amine, isopropyl amine, butyl amine, amyl amine, methylbutyl amine, dimethyl amine and trimethyl amine (these latter two compounds are difficult to handle being gases), dimethylamino propylamine, diethylamino propylamine, ethylene diamine, diethylene triamine, propylene diamine, 1,3-diaminopropane, N,N,N',N'-tetramethyl butanediamine, monoethanolamine, N-methylethanolamine, N-ethylethanolamine, N,N-dimethylethanolamine, N,N - diethylethanolamine, N-aminoethylethanolamine, monoisopropanolamine, morpholine, 2,6-dimethylmorpholine, N-methylmorpholine, N-ethylmorpholine, piperazine, N-methylpiperazine, N-hydroxyethyl piperazine, N-aminoethyl piperazine. A wide variety of other amines may be employed including mixtures of amines if they are water soluble and will form the quaternary ammonium salt with a carboxyl group in aqueous solution. However, in the formulation of a marketable and commercially desirable product, qualities such as the toxicity and the odiferousness of the amine are of primary importance. For example an amine such as cadaverine (1,5-pentanediamine) would be satisfactory from a chemical standpoint, but if incorporated in a coating would create a highly undesirable odor as the coating dries.

It will be obvious that upon obtaining the polyester-carboxylic acid adduct having pendant carboxyl groups, that these carboxyl groups could be rendered hydrophilic by a method other than by creation of the quaternary ammonium salt, though this method is here preferred. For example, reaction of the carboxyl groups with an alkali metal hydroxide will result in the formation of the alkali metal salt, which is a hydrophile. The alkali metal salts are extremely basic and would raise the pH of the polyestercarboxylic acid adduct solution considerably. However, a highly alkaline solution causes additional hydrolytic attack upon the ester groups of the polyester-carboxylic acid adduct itself thus degrading the basic resin portion of the coating. Minor amounts of an alkali metal hydroxide preferably less than 25 percent of the stoichiometric equivalency of carboxyl groups of the adduct may be tolerated. At times a small amount of alkali metal hydroxide, e.g., sodium or potassium hydroxide, is advantageous in promoting the quaternary reaction.

To obtain optimum solubility of the polyester-carboxylic acid adduct there is employed sufficient amine (and alkali metal hydroxide if employed) to react with at least all the free carboxyl groups in the polymer. Therefore, preferably there is added an amount of the amine and hydroxide stoichiometrically equivalent to the amount of $\alpha,\beta$-unsaturated dicarboxylic acid added to polyester in the adduction step. Since the purpose of the adduction is to create sites which may be rendered hydrophilic, the use of less than the stoichiometric equivalence of amine is not desirable. Generally an excess of amine is preferred and preferably up to 50 percent excess based on the weight of the stoichiometric requirement of amine is employed. Preferably about 10 percent by weight excess based on the weight of the stoichiometric requirement of amine is employed. It has been found that addition of excess amine improves the water compatibility of the polyester-carboxylic acid adduct. But concurrently the presence of excess amine tends to raise the pH, increasing the hydrolytic attack upon the ester groups of the polyester, and also tends to result in an ultimate coating having a longer drying time.

The addition of the amine is accomplished by simply adding an aqueous solution containing the amine and stirring into the polyester-carboxylic acid adduct. Since the adduction step is commonly carried out at temperatures above 100° C., it is obvious that it would be most desirable to effect the addition of the aqueous amine solution following a cooling of the polyester-carboxylic acid adduct to a temperature below 100° C., so as to prevent the vaporization of the water of the solution. Aside from this consideration, the amine addition may be effected over a broad range of temperatures from ambient temperatures up to 100° C.

The amine is preferably added as a solute in sufficient water to assure the formation of the quaternary ammonium salt of the free carboxyl groups of the adduct rather than the amide. Generally, at least an equimolar amount of water based on the amine is employed. More commonly for facility in formulation, the amine is added as about a 50 percent solution in water.

The addition of the amine renders the polyester-carboxylic acid adduct compatible with water and usually the water compatible adduct will form a solution with the relatively small amount of water added with the amine. Despite the formation of hydrophiles, e.g., quaternary ammonium groups, the water-compatible polyester-carboxylic acid adduct hereinafter called the "neutralized resin," is not miscible with water in all proportions. However, in formulating a water based coating it is necessary to provide a resin solution of the neutralized resin which may be diluted with water down to application viscosity, and more desirably to provide a resin solution which is capable of even extreme dilution with water, down to a solution containing 5 percent or less of resin solids, i.e., the neutralized resin. The extreme dilutability facilitates formulation of a wide variety of coatings and also enables brush cleaning with water alone following application of the coating. To obtain such water dilutable solutions, it is necessary to employ an organic cosolvent to increase the solubility of the neutralized resin in water.

In preparing a coating, the organic cosolvent is generally added to the neutralized resin (containing the water added during the amine addition) in sufficient amount to permit further dilution with water alone to application viscosity without causing the neutralized resin to come out of solution. More preferably enough cosolvent should be added to permit dilution to a solution containing no more than 5 weight percent neutralized resin, without causing the neutralized resin to come out of solution. Accordingly, it is convenient to provide a coatings vehicle already containing the organic cosolvent, which vehicle may be subsequently modified with pigments, colorants, and driers, and may be diluted to the desired application viscosity with water alone without danger of precipitating the neutralized resin from solution.

Useful organic cosolvents are identified by high solubilities for both water and the neutralized resin. The necessary properties of suitable organic solvents may be readily ascertained following a consideration of the ternary miscibility data of the neutralized resin-solvent-water system. In general, upon addition of the aqueous amine solution to the polyester-carboxylic acid adduct there is obtained a solution, or a mixture, containing a predominant amount of neutralized resin and a minor amount of water. The organic cosolvent is added to this system in an amount sufficient to produce a single liquid phase comprising the neutralized resin, the cosolvent and the water, and moreover, in sufficient amount to maintain this single liquid phase upon subsequent dilution of the neutralized resin solution with water to the concentration desired for application. As hereinbefore pointed out it is highly desirable to add sufficient cosolvent as to enable even extreme dilution with water, down to 5 percent neutralized resin on solution. The amount of cosolvent which must be added to the neutralized resin will depend upon the particular ternary system. A prime consideration is the water compatibility of the neutralized resin, i.e., the number of hydrophilic moieties introduced into the polyester-carboxylic acid adduct by addition of the amine. Generally the addition of from about 0.15 to about 2 parts by weight of cosolvent based upon the weight of the neutralized resin is sufficient to enable subsequent dilution with water down to a concentration of 5 percent neutralized resin. More preferably, admirably suitable coatings contain from 0.25 to 1 part by weight of cosolvent based on the weight of the neutralized resin. However, the amount of cosolvent to be added in each particular instance may be dictated by additional factors other than solubility. For example, if drying characteristics or viscosity of the coatings are of prime importance, the choice and amount of cosolvent to be employed may be accommodated to achieve this objective. Mixtures of fast evaporating and slow evaporating cosolvents are useful to provide coatings which set in a fairly short time but do not dry completely so quickly as to afford an unduly short lap time during which retouching can be effected without marring the uniformity and color of the coating finish. Such retarding of rapid dry also affords improved brush cleansibility. In such formulations the slow evaporating cosolvent, called a retarder, is usually employed in amounts ranging from about 0.05 to about 0.5 part by weight based upon the weight of the neutralized resin. It is pointed out that an increase of cosolvent, an excess of that needed to permit subsequent dilution of the neutralized resin with water, will result in a decrease in viscosity of the ultimate coating.

Typical cosolvents which may be employed demonstrate a high solubility in water, over about 90 percent, and a high solubility for the neutralized resin. In all instances, however, the ternary miscibility characteristics of the solvent on the neutralized resin-solvent-water system will permit dilution to a solution of 5 percent neutralized resin or less while maintaining a single continuous phase. Suitable cosolvents include the alkylene glycol monoalkyl ethers such as methoxyethanol, ethoxyethanol, propoxyethanol, butoxyethanol, methoxypropanol, ethoxypropanol, propoxypropanol, butoxypropanol, the methyl ethers of butylene glycol and of hexylene glycol; the dialkyl ethers of alkylene glycol such as dimethoxyethane, the alkyl and dialkyl ethers of diethylene glycol such as the methyl, ethyl, propyl and butyl ethers of diethylene glycol, e.g., butyl Carbitol, and the dimethyl diethyl ethers of diethylene glycol; the cyclic ethers such as tetrahydrofuran and dioxane; diacetone alcohol and the like. The alkylene glycols, such as butylene glycol, are suitable solubility-wise but by virtue of their high boiling points would result in air-drying coatings having an extended drying time though this would not preclude their use in bake-dry coatings. These high boiling compounds can be used in small amounts with other cosolvents as retarders. Of course in formulating an ultimate composition, physical qualities such as odor, toxicity, and flammability are of prime importance, and choice of the cosolvent will often be dictated by such characteristics. It will be obvious that a wide variety of solvents which increase the solibility of the neutralized resin in water can be used in formulating coatings within the scope of this invention. The water compatibility of the neutralized resins of this invention will enable their use with a broad range of solvents to obtain fast or slow drying industrial or consumer coatings. Usually for air drying coatings it is desirable to utilize a primary cosolvent or mixture of cosolvents boiling at a temperature of less than about 200° C. As pointed out above the primary cosolvents may be used in conjunction with a high boiling retarder, e.g., a solvent boiling at a temperature up to 250° C. or higher, to obtain specific drying characteristics.

The neutralized resin vehicles provided herein may be employed in a broad spectrum of coatings varying from clear varnishes and high gloss enamels to flat interior wall paints. The vehicles may be used as the sole film former in the coating compositions or in combination with vinyl type latexes, if desired. Formulation of paints from the neutralized resin vehicles may be conveniently accomplished in standard paint manufacturing equipment ordinarily employed in the industry for oil or water based paint formulations. The pigment dispersion in the resin solution may be accomplished by means of a roll mill, a ball mill, a sand mill or the like. Ball mill dispersion often results in excessive foamings and hence is not preferred.

The paint compositions formulated in accordance with this invention utilize the novel neutralized resin as the primary non-volatile binder, or film former, of the coating. Although, as pointed out, the amine portion of the neutralized resin will slowly evaporate from the coating during the drying process, the neutralized resin is deemed a non-volatile component. The total non-volatile volume of a paint composition is the sum of the pigment or extender and the non-volatile binder, which, as hereinbefore pointed out may comprise the novel neutralized resin alone or in combination with a vinyl type latex or other binder. Suitable latexes are dispersions of plastic semi-solids such as butadiene-styrene copolymer, polystyrene in both pre-plasticized and post-plasticized system, polyvinyl acetate and the like. Water and the cosolvent form the main volatile components of the paint composition. In addition to the volatile and non-volatile components, the novel ultimate paint compositions of this invention also contain a metallic drier.

Accordingly the novel neutralized resins are employed in paint compositions using various components otherwise known in the art. Formulation methods similar to those of the art may also be employed. The neutralized resin may merely be formulated as have been other binders in paint manufacture. In this regard the paints utilizing neutralized resin may be prepared using other well known paint ingredients such as emulsifying agents, dyes, colorants, antifoaming agents and the like, according to the ultimate properties desired and the properties of the paint which are encountered.

The neutralized resins may be employed in conjunction with a wide variety of opacifying and extending pigments to produce a wide variety of paint formulations. It is preferred, in formulating paints from the neutralized resin solution to employ pigments which are not acid reactive. Such pigments, e.g., zinc oxide, calcium sulfate and the like, tend to crosslink the resin and thicken and ultimately gel the paint. Eminently suitable as opacifying a pigment is titanium dioxide, ferric oxide, and carbon black, and as extending pigments, silica, talc, clay and the like. These pigments may be used in conjunction with colorants such as phthalocyanine green to produce variously colored paints.

As hereinbefore pointed out the compositions of this invention may be employed in high gloss enamels, semi-gloss paints, and interior flat paints. The degree of light reflection of the ultimate paint will be determined primarily by the amount of pigment employed. Pigment volume concentration based on the overall volume of non-volatile vehicle varies from as low as about 10 to about 30 percent for high gloss enamel paints to as high as about 45 to about 65 percent for flat interior wall paints. Semi-gloss finishes may be obtained by using intermediate pigment volume concentrations of from about 30 to about 45 percent. The light reflectance properties however are largely dependent upon the particular pigment employed and the resin vehicle, as will be appreciated by those skilled in the art.

Metallic driers are generally employed in the novel paint compositions of this invention in small amounts sufficient to impart desired drying characteristics. Suitable driers are metallic salts of carboxylic acids, and are known in the art. Typical driers include cobalt, manganese and zirconium salts such as cobalt naphthenate, cobalt linolate, manganese tallate, zirconium octoate, cobalt octoate and the like. For obvious reasons, preferred driers are water soluble or water dispersible. Driers are employed in small amounts depending upon the resin vehicle itself desired drying characteristics. Generally from about 0.005 to about 1 percent by weight of the metal of the drier based on the weight of the neutralized resin composition is employed.

As hereinbefore discussed the neutralized resin solutions of this invention may be diluted with water alone to application viscosity. For example the neutralized resin may be pigmented on a roll mill using only a portion of the neutralized resin to disperse the pigment, and subsequently adding neutralized resin and water to achieve the finished paint composition. The viscosities of the finished paint compositions can be varied depending upon intended use, but usually range from about 50 to 90 Krebs units. It should be noted that if formulating of the final composition is carried out by diluting a pigmented neutralized resin solution, that a parallel formulation without pigment should be examined for clarity to assure complete solubility of the neutralized resin. In this regard, often provision for a small increase in the amount of cosolvent in the formulation recipe will generally restore clarity to the solution.

The preparation of the polycyclic hydroxy compounds of this invention may be accomplished by known methods. For example, the preparation of monoepoxy alcohols, monoepoxy oxyalkanols, monoepoxy oxyalkane polyols, as well as the monoepoxy diols of compounds having the tricyclo[5.2.1.0$^{2,6}$]decanoid ring or the tetracyclo[6.2.1. 1$^{3,6}$.0$^{2,7}$]dodecanoid ring is disclosed in French Patent No. 1,305,630. Monoepoxy hydroxyl-containing compounds having other polycarbocyclic ring structures as illustrated herein may be prepared by analogous procedures employing the polycarbocyclic diene corresponding to the desired ring structure in the place of dicyclopentadiene as employed in the preparative procedures in the above cited French patent.

The polycarbocyclic dienes corresponding to ring structures hereinbefore illustrated and set forth may be prepared by Diels-Alder addition. For example the tricyclo-[6.2.1.0$^{2,7}$]undeca-2,9-diene ring is obtained by Diels-Alder addition of bicyclo[2.2.1]heptadiene and butadiene. Similarly tetracyclo[6.5.1.0$^{2,7}$.0$^{9,13}$]tetradeca-3,11-decadiene can be synthesized by Diels-Alder addition of tricyclo-[5.2.1.0$^{2,6}$]deca-3,8-diene and butadiene. To further illustrate, hexacyclo[6.6.1.1$^{3,6}$.1$^{10,13}$.1$^{2,9}$.0$^{9,14}$]heptadeca - 4, 11-diene may be produced by Diels-Alder addition of cyclopentadiene to tetracyclo[6.2.1.1$^{3,6}$.0$^{2,7}$]dodeca - 4,9-diene. Monoepoxy diols may be conveniently prepared by hydrolyzing the above diepoxides with an equimolar amount of water under very slightly acidic conditions.

Diepoxides useful in the polyesters of the instant invention may be prepared by epoxidation of the corresponding dienic precursor with sufficient epoxidizing agent, to introduce the vicinal cyclic epoxy group at both unsaturated sites in the polycarbocyclic ring. Suitable epoxidizing agents, and conditions for diepoxidation are similar to those disclosed in French Patent 1,305,630 for epoxidizing the polycyclic alcohols to obtain the monoepoxy alcohols.

It is to be understood that polycyclic hydroxy compounds containing the oxymethyleneoxy radical, i.e., —OCH$_2$O—, is not encompassed within the scope of this invention. Accordingly, compounds having an oxymethanol group, an oxymethyleneoxyalkanol group, an oxymethyleneoxypolyol group or the like are not to be deemed included with the polycyclic hydroxy compounds useful in the compositions of this invention.

In referring to the ring structures of the polycyclic hydroxy compounds of this invention the suffix "oid" has been used. This suffix indicates resemblance or likeness and is employed in instances wherein there is no attempt to characterize the polycyclic hydroxy compounds themselves but only to illustrate the type of ring structures they possess.

The following examples are illustrative.

Example 1

(A) To a five-liter flask equipped with a stirrer was added 374 grams of 4 - oxatetracyclo[6.2.1.0$^{2,7}$.0$^{3,5}$]undecan-9(10)-ol (6.76 equivalents), 740 grams of soya fatty acids (2.64 equivalents) and 255 grams of tetrahydrophthalic anhydride (3.36 equivalents), and 100 grams of xylene as a diluent for the reaction mixture. The reaction mixture was heated under an atmosphere of nitrogen to 225° C. and maintained at this temperature for 11.5 hours. During this time the water of esterification was vaporized and was removed as a constant boiling azeotrope with xylene. The reaction product appeared as a moderately viscous yellow liquid which upon titration with KOH was found to have an acid number of 13.4 which indicated the esterification was substantially complete.

(B) The reaction product mixture obtained in A, above, was then cooled to 50° C. and 48.0 grams of maleic anhydride (0.98 equivalent) were then added. To prevent discoloration of the polyester 6.9 grams of diphenylpentaerythritol diphosphite, a stabilizer, were added with the maleic acid anhydride. The temperature of the mixture was increased to 100° C. and 1.37 grams of iodine dissolved in 13.7 grams of xylene were added. The temperature was further increased to 225° C. and maintained for 2 hours while the mixture was agitated. The polyester-carboxylic acid adduct so produced was characterized as a viscous yellow liquid.

(C) To the agitated polyester carboxylic acid adduct at 90° C. were added 163 grams of N,N-dimethylethanolamine (1.83 equivalents) in 35.2 grams of water. The acid number was determined using sodium methoxide, and was found to be 26.2. Agitation was continued for 15 minutes at the end of which time a solution of 424 grams of n-propoxypropanol in 106 grams of butyl Carbitol was added. Amidst additional stirring, 1,118 grams of water were also added. This solution contained about 40 percent by weight resin solids which were completely dissolved.

Example 2

(A) To a five-liter flask equipped with a stirrer was added 374 grams of 4 - oxatetracyclo[6.2.1.0$^{2,7}$.0$^{3,5}$]undecan-9(10)-ol (6.76 equivalents), 740 grams of soya fatty acids (2.64 equivalents) and 255 grams of tetrahydrophthalic anhydride (3.36 equivalents), and 100 grams of xylene as a diluent for the reaction mixture. The reaction mixture was heated under an atmosphere of nitrogen to 225° C. and maintained at this temperature for 9.5 hours. During this time the water of esterification was vaporized and was removed as a constant boiling azeotrope with xylene. The reaction product appeared as a moderately viscous yellow liquid which upon titration with KOH was found to have an acid number of 14.3 which indicated the esterification was substantially completed.

(B) The reaction product mixture obtained in A, above, was then cooled to 50° C. and 66.6 grams of maleic anhydride (1.36 equivalents) were then added. To prevent discoloration of the polyester 6.9 grams of diphenylpentaerythritol diphosphite, a stabilizer, were added with the maleic acid anhydride. The temperature of the mixture was increased to 100° C. and 1.39 grams of iodine dissolved in 13.9 grams of xylene were added. The temperature was further increased to 225° C. and maintained for 2 hours while the mixture was agitated. The polyester-carboxylic acid adduct gelled during the heating period.

Example 3

(A) To a five-liter flask equipped with a stirrer was added 374 grams of 4 - oxatetracyclo[6.2.1.0$^{2,7}$.0$^{3,5}$]undecan-9(10)-ol (6.76 equivalents), 790 grams of soya fatty acids (2.82 equivalents) and 242 grams of tetrahydrophthalic anhydride (3.18 equivalents), and 100 grams of xylene as a diluent for the reaction mixture. The reaction mixture was heated under an atmosphere of nitrogen to 225° C. and maintained at this temperature for 10 hours. During this time the water of esterification was vaporized and was removed as a constant boiling azeotrope with xylene. The reaction product appeared as a moderately viscous yellow liquid which upon titration with KOH was found to have an acid number of 14.0 which indicated the esterification was substantially complete.

(B) The reaction product mixture obtained in A, above, was then cooled to 50° C. and 169 grams of soya fatty acids (0.604 equivalent) were added. This constituted a 8.93 percent excess based upon the original hydroxyl equivalency of the 4 - oxatetracyclo[6.2.1.0$^{2,7}$.0$^{3,5}$]undecan-9(10)-ol. Maintaining this temperature, 85.0 grams of maleic anhydride (1.73 equivalents) were then added. To prevent discoloration of the polyester 8.1 grams of diphenylpentaerythritol diphosphite, a stabilizer, were added with the maleic acid anhydride. The temperature of the mixture was increased to 100° C. and 1.61 grams of iodine dissolved in 16.1 grams of xylene were added. The temperature was further increased to 225° C. and maintained for 2 hours while the mixture was agitated. The polyester-carboxylic acid adduct so produced was characterized as a viscous yellow liquid.

(C) To the agitated polyester carboxylic acid adduct at 90° C. were added 228 grams of N,N-dimethylethanolamine (2.56 equivalents) in 172 grams of water. The acid number was determined using aqueous KOH, and was found to be 60.3. Agitation was continued for 15 minutes at the end of which time a solution of 516 grams of n-propoxypropanol in 129 grams of butyl Carbitol was added. Amidst additional stirring, 1234 grams of water were also added. This solution contained about 40 percent by weight resin solids which were completely dissolved.

Example 4

(A) To a five-liter flask equipped with a stirrer were added 374 grams of 4-oxatetracyclo[6.2.1.0$^{2,7}$.0$^{3,5}$] undecan-9(10)-ol (6.76 equivalents), 790 grams of soya fatty acids (2.82 equivalents) and 242 grams of tetrahydrophthalic anhydride (3.18 equivalents), and 100 grams of xylene as a diluent for the reaction mixture. The reaction mixture was heated under an atmosphere of nitrogen to 225° C. and maintained at this temperature for 10.5 hours. During this time the water of esterification was vaporized and was removed as a constant boiling azeotrope with xylene. The reaction product appeared as a moderately viscous yellow liquid which upon titration with KOH was found to have an acid number of 13.7 which indicated the esterification was substantially complete.

(B) The reaction product mixture obtained in A, above, was then cooled to 50° C. and 169 grams of soya fatty acids (0.604 equivalent) were added. This constituted an 8.93 percent excess based upon the original hydroxyl equivalency of the 4-oxatetracyclo[6.2.1.0$^{2,7}$.0$^{3,5}$]undecan-9(10)-ol. Maintaining this temperature, 99.5 grams of maleic anhydride (2.03 equivalents) were then added. To prevent discoloration of the polyester 8.1 grams of diphenylpentaerythritol diphosphite, a stabilizer were added with the maleic acid anhydride. The temperature of the mixture was increased to 100° C. and 1.63 grams of iodine dissolved in 16.3 grams of xylene were added. The temperature was further increased to 225° C. and maintained for 2 hours while the mixture was agitated. The polyester-carboxylic acid adduct so produced was characterized as a viscous yellow liquid.

(C) To the agitated polyester carboxylic acid adduct at 90° C. were added 257 grams of N,N-dimethylethanolamine (2.88 equivalents) in 173 grams of water. The acid number was determined using alcoholic KOH and was found to be 70.8 which indicated substantially complete hydrolysis of the maleic anhydride. Agitation was continued for 15 minutes at the end of which time a solution of 520 grams of n-propoxypropanol in 130 grams of butyl Carbitol was added. Amidst additional stirring, 1243 grams of water were also added. This solution contained about 40 percent by weight resin solids which were completely dissolved.

Example 5

(A) To a five-liter flask equipped with a stirrer was added 374 grams of 4-oxatetracyclo[6.2.1.0$^{2,7}$.0$^{3,5}$]undecan-9(10)-ol (6.76 equivalents), 790 grams of soya fatty acids (2.82 equivalents) and 242 grams of tetrahydrophthalic anhydride (3.18 equivalents), and 100 grams of xylene as a diluent for the reaction mixture. The reaction mixture was heated under an atmosphere of nitrogen to 225° C. and maintained at this temperature for 10.5 hours. During this time the water of esterification was vaporized and was removed as a constant boiling azeotrope with xylene. The reaction product appeared as a moderately viscous yellow liquid which upon titration with KOH was found to have an acid number of 13.8 which indicated the esterification was substantially complete.

(B) The reaction product mixture obtained in A, above, was then cooled to 50° C. and 169 grams of soya fatty acids (0.604 equivalent) were added. This constituted a 8.93 percent excess based upon the original hydroxyl equivalency of the 4-oxatetracyclo[6.2.1.0$^{2,7}$.0$^{3,5}$] undecan-9(10)-ol. Maintaining this temperature, 115 grams of maleic anhydride (2.34 equivalents) were then added. To prevent discoloration of the polyester 8.2 grams of diphenylpentaerythritol diphosphite, a stabilizer, were added with the maleic acid anhydride. The temperature of the mixture was increased to 100° C. and 1.64 grams of iodine dissolved in 16.4 grams of xylene were added. The polyester-carboxylic acid adduct so produced was characterized as a viscous yellow liquid.

(C) To the agitated polyester carboxylic acid adduct at 90° C. were added 288 grams of N,N-dimethylethanolamine (3.23 equivalents) in 175 grams of water. The acid number was determined using alcoholic KOH and was found to be 73.1 which indicated substantially complete hydrolysis of the maleic anhydride. Agitation was continued for 15 minutes at the end of which time a solution of 525 grams of n-propoxypropanol in 131 grams of butyl Carbitol was added. Amidst additional stirring, 1256 grams of water were also added. This solution contained about 40 percent by weight resin solids which were completely dissolved.

In like manner when 420 grams of 4-oxatetracyclo-[6.2.1.0$^{2,7}$.0$^{3,5}$] undec-9(10)-oxyethanol (6.0 equivalents) are used in place of 4-oxatetracyclo[6.2.1.0$^{2,7}$.0$^{3,5}$]undecan-9(10)-ol in the above procedure, there is obtained an amine-modified polyester-carboxylic adduct which is completely soluble in 656 grams of n-propoxypropanol and 1256 grams of water to yield a solution containing approximately 40 percent resin solids.

Example 6

(A) To a five-liter flask equipped with a stirrer was added 374 grams of 4-oxatetracyclo[6.2.1.0$^{2,7}$.0$^{3,5}$]undecan-9(10)-ol (6.76 equivalents), 807 grams of tall fatty acids (2,82 equivalents) and 242 grams of tetrahydrophthalic anhydride (3.18 equivalents), and 100 grams of xylene as a diluent for the reaction mixture. The reaction mixture was heated under an atmosphere of nitrogen to 225° C. and maintained at this temperature for 10 hours. During this time the water of esterification was vaporized and was removed as a constant boiling azeotrope with xylene. The reaction product appeared as a moderately viscous yellow liquid which upon titration with KOH was found to have an acid number of 14.2 which indicated the esterification was substantially complete.

(B) The reaction product mixture obtained in A, above, was then cooled to 50° C. and 171 grams of tall fatty acids (0.598 equivalent) were added. This constituted an 8.84 percent excess based upon the original hydroxyl equivalency of the 4-oxatetracyclo-[6.2.1.0$^{2,7}$.0$^{3,5}$]undecan-9(10)-ol Maintaining this temperature, 85 grams of maleic anhydride (1.74 equivalents) were then added. To prevent discoloration of the polyester 8.2 grams of diphenylpentaerythritol diphosphite, a stabilizer, were added with the maleic acid anhydride. The temperature of the mixture was increased to 100° C. and 1.63 grams of iodine dissolved in 16.3 grams of xylene were added. The temperature was further increased to 225° C. and maintained for 2 hours while the mixture was agitated. The polyester-carboxylic acid adduct so produced was characterized as a viscous yellow liquid.

(C) To the agitated polyester carboxylic acid adduct at 90° C. were added 228 grams of N,N-dimethylethanolamine (2.56 equivalents) in 174 grams of water. The acid number was determined using alcoholic KOH, and was found to be 61.3 which indicated substantially complete hydrolysis of the maleic anhydride. Agitation was continued for 15 minutes at the end of which time a solution of 522 grams of n-propoxypropanol in 130 grams of butyl carbitol was added. Amidst additional stirring, 1247 grams of water were also added. This solution contained about 40 percent by weight resin solids which were completely dissolved.

In like manner when 508 grams of 4-oxatetracyclo-[6.2.1.0$^{2,7}$.0$^{3,5}$]undec-9(10) - oxydi(ethylene oxy)ethanol (6.0 equivalents) are used in place of 4-oxatetracyclo-[6.2.1.0$^{2,7}$.0$^{3,5}$]-undecan-9(10)-ol in the above procedure, there is obtained an amine-modified polyester-carboxylic adduct which is completely soluble in 652 grams of n-propoxypropanol and 1247 grams of water to yield a solution containing approximately 40 percent resin solids.

Example 7

(A) To a five-liter flask equipped with a stirrer was added 374 grams of 4-oxatetracyclo[6,2.1.0$^{2,7}$.0$^{3,6}$]undecan-9(10)-ol (6.76 equivalents), 807 grams of tall fatty acids (2.82 equivalents) and 242 grams of tetrahydrophthalic anhydride (3.18 equivalents), and 100 grams of xylene as a diluent for the reaction mixture. The reaction mixture was heated under an atmosphere of nitrogen to 225° C. and maintained at this temperature for 11 hours. During this time the water of esterification was vaporized and was removed as a constant boiling azeotrope with axylene. The reaction product appeared as a moderately viscous yellow liquid which upon titration with KOH was found to have an acid number of 13.4 which indicated the esterification was substantially complete.

(B) The reaction product mixture obtained in A, above, was then cooled to 50° C. and 171 grams of tall fatty acids (0.598 equivalent) were added. This constituted an 8.84 percent excess based upon the original hydroxyl equivalency of the 4-oxatetracyclo[6.2.1.0$^{2,7}$.0$^{3,5}$]undecan-9(10)-ol. Maintaining this temperature, 100.0 grams of maleic anhydride (2.05 equivalents) were then added. To prevent discoloration of the polyester 8.2 grams of diphenylpentaerythritol diphosphite, a stabilizer, were added with the maleic acid anhydride. The temperature of the mixture was increased to 100° C. and 1.64 grams of iodine dissolved in 16.4 grams of xylene were added. The temperature was further increased to 225° C. and maintained for 2 hours while the mixture was agitated. The polyester-carboxylic acid adduct so produced was characterized as a viscous yellow liquid.

(C) To the agitated polyester carboxylic acid adduct at 50° C. were added 258 grams of N,N-dimethylethanolamine (2.89 equivalents) in 176 grams of water. The acid number was determined using alcoholic KOH, and was found to be 66.0 which indicated substantially complete hydrolysis of the maleic anhydride. Agitation was continued for 15 minutes at the end of which time a solution of 527 grams of n-propoxypropanol in 132 grams of butyl carbitol was added. Amidst additional stirring, 1259 grams of water were also added. This solution contained about 40 percent by weight resin solids which were completely dissolved.

In like manner when 556 grams of 5-oxapentacyclo-[6.6.1.0$^{2,7}$.0$^{4,6}$.0$^{9,14}$]pentadec-11 - ylmethyleneoxyethanol (6.0 equivalents) are used in place of 4-oxatetracyclo-[6.2.1.0$^{2,7}$.0$^{3,5}$]undecan-9(10)-ol in the above procedure, there is obtained an amine-modified polyester-carboxylic adduct which is completely soluble in 659 grams of n-propoxypropanol and 1259 grams of water to yield a solution containing approximately 40 percent resin solids.

Example 8

(A) To a five-liter flask equipped with a stirrer was added 374 grams of 4-oxatetracyclo[6,2.1.0$^{2,7}$.0$^{3,5}$]undecan-9(10)-ol (6.76 equivalents), 807 grams of tall fatty acids (2.82 equivalents) and 242 grams of tetrahydrophthalic anhydride (3.18 equivalents), and 100 grams of xylene as a diluent for the reaction mixture. The reaction mixture was heated under an atmosphere of nitrogen to 225° C. and maintained at this temperature for 11 hours. During this time the water of esterification was vaporized and was removed as a constant boiling azeotrope with xylene. The reaction product appeared as a moderately viscous yellow liquid which upon titration with KOH was found to have an acid number of 13.4 which indicated the esterification was substantially complete.

(B) The reaction product mixture obtained in A, above, was then cooled to 50° C. and 171 grams of tall fatty acids (0.598 equivalent) were added. This constituted an 8.84 percent excess based upon the original hydroxy equivalency of the 4-oxatetracyclo[6.2.1.0$^{2,7}$.0$^{3,5}$]undecan-9(10)-ol. Maintaining this temperature, 116 grams of maleic anhydride (2.37 equiavlents) were then added. To prevent discoloration of the polyester 8.3 grams of diphenylpentaerythritol diphosphite, a stabilizer, were added with the maleic acid anhydride. The temperature of the mixture was increased to 100° C. and 1.66 grams of iodine dissolved in 16.6 grams of xylene were added. The temperature was further increased to 225° C. and maintained for 2 hours while the mixture was agitated. The polyester-carboxylic acid adduct so produced was characterized as a viscous yellow liquid.

(C) To the agitated polyester carboxylic acid adduct at 50° C. were added 290 grams of N,N-dimethylethanolamine (3.25 equivalents) in 177 grams of water. The acid number was determined using alcoholic KOH, and was found to be 68.9 which indicated substantially complete hydrolysis of the maleic anhydride. Agitation was continued for 15 minutes at the end of which time a solution of 532 grams of n-propoxypropanol in 133 grams of butyl carbitol was added. Amidst additional stirring, 1271 grams of water were also added. This solution contained about 40 percent by weight resin solids which were completely dissolved.

Example 9

(A) To a five-liter flask equipped with a stirrer was added 374 grams of 4-oxatetracyclo[6.2.1.0$^{2,7}$.0$^{3,5}$]undecan-9(10)-ol (6.76 equivalents), 807 grams of tall fatty acids (2.82 equivalents) and 242 grams of tetrahydrophthalic anhydride (3.18 equivalents), and 100 grams of xylene as a diluent for the reaction mixture. The reaction mixture was heated under an atmosphere of nitrogen to 225° C. and maintained at this temperature for 12 hours. During this time the water of esterification was vaporized and was removed as a constant boiling azeotrope with xylene. The reaction product appeared as a moderately viscous yellow liquid which upon titration with KOH was found to have an acid number of 16.8 which indicated the esterification was substantially complete.

(B) The reaction product mixture obtained in A, above, was then cooled to 50° C. and 171 grams of tall fatty acids (0.598 equivalent) were added. This constituted an 8.84 percent excess based upon the original hydroxyl equivalency of the 4-oxatetracyclo[6.2.1.0$^{2,7}$.0$^{3,5}$]undecan-9(10)-ol. Maintaining this temperature, 148 grams of maleic anhydride (3.02 equivalents) were then added. To prevent discoloration of the polyester 8.5 grams of diphenylpentaerythritol diphosphite, a stabilizer, were added with the maleic acid anhydride. The temperature of the mixture was increased to 100° C. and 1.69 grams of iodine dissolved in 16.9 grams of xylene were added. The temperature was further increased to 225° C. and maintained for 2 hours while the mixture was agitated. The polyester-carboxylic acid adduct so produced was characterized by a viscous yellow liquid.

(C) To the agitated polyester carboxylic acid adduct at 80° C. were added a solution of 241 grams of concentrated aqueous ammonium hydroxide (3.97 NH$_3$ equivalent), 8 additional grams of water, and 542 grams of n-propoxypropanol in 135 grams of butyl carbitol. The acid number was determined using alcoholic KOH, and was found to be 81.3 which indicated substantially complete hydrolysis of the maleic anhydride. Amidst additional stirring, 1296 grams of water were also added. This solution contained about 40 percent by weight resin solids which were completely dissolved.

Example 10

(A) To a five-liter flask equipped with a stirrer was added 374 grams of 4-oxatetracyclo[6.2.1.0$^{2,7}$.0$^{3,5}$]undecan-9(10)-ol (6.76 equivalents), 790 grams of soya fatty acids (2.82 equivalents) and 242 grams of tetrahydrophthalic anhydride (3.18 equivalents), and 100 grams of xylene as a diluent for the reaction mixture. The reaction mixture. The reaction mixture was heated under an atmosphere of nitrogen to 225° C. and maintained at this temperature for 9.5 hours. During this time the water of esterification was vaporized and was removed as a constant boiling azeotrope with xylene. The reaction product appeared as a moderately viscous yellow liquid which upon titration with KOH was found to have an acid number of 14.6 which indicated the esterification was substantially complete.

(B) The reaction product mixture obtained in A, above, was then cooled to 50° C. and 169 grams of soya fatty acids (0.604 equivalent) were added. This constituted an 8.93 percent excess based upon the original hydroxyl equivalency of the 4-oxatetracyclo[6.2.1.0$^{2,7}$.0$^{3,5}$]undecan-9(10)-ol. Maintaining this temperature, 99.5 grams of maleic anhydride (2.03 equivalents) were then added. To prevent discoloration of the polyester 8.1 grams of diphenylpentaerythritol diphosphite, a stabilizer, were added with the maleic acid anhydride. The temperature of the mixture was increased to 100° C. and 1.60 grams of iodine dissolved in 16.0 grams of xylene were added. The temperature was further increased to 225° C. and maintained for 2 hours while the mixture was agitated. The polyester-carboxylic acid adduct so produced was characterized as a viscous yellow liquid.

(C) To the agitated polyester carboxylic acid adduct at 80° C. were added a solution of 176 grams of concentrated aqueous ammonium hydroxide (2.90 NH$_3$ equivalents), 46 additional grams of water, and 521 grams of n-propoxypropanol in 130 grams of butyl carbitol. The acid number was determined using alcoholic KOH, and was found to be 59.3 which indicated substantially complete hydrolysis of the maleic anhydride. Amidst additional stirring, 1244 grams of water were also added. This solution contained about 40 percent by weight resin solids which were completely dissolved.

Example 11

(A) To a five-liter flask equipped with a stirrer was added 374 grams of 4-oxatetracyclo[6.2.1.0$^{2,7}$.0$^{3,5}$]undecan-9(10)-ol (6.76 equivalents), 858 grams of tall fatty acids (3.0 equivalents), 203 grams of phthalic anhydride (2.74 equivalents), 13 grams of maleic anhydride (0.26 equivalent) and 100 grams of xylene as a diluent for the reaction mixture. The reaction mixture was heated under an atmosphere of nitrogen to 225° C. and maintained at this temperature for 11 hours. During this time the water of esterification was vaporized and was removed as a constant boiling azeotrope with xylene. The reaction product appeared as a moderately viscous, dark liquid which upon titration with KOH was found to have an acid number of 17.5 which indicated the esterification was substantially complete.

(B) The reaction product mixture obtained in A, above, was then cooled to 50° C. and 172 grams of tall fatty acids (0.601 equivalent) were added. This constituted an 8.89 percent excess based upon the original hydroxyl equivalency of the 4-oxatetracyclo[6.2.1.0$^{2,7}$.0$^{3,5}$]undecan-9(10)-ol. Maintaining this temperature, 118 grams of maleic anhydride (2.41 equivalents) were then added. To prevent discoloration of the polyester 8.5 grams of diphenylpentaerythritol diphosphite, a stabilizer, were added with the maleic acid anhydride. The temperature of the mixture was increased to 100° C. and 1.69 grams of iodine dissolved in 16.9 grams of xylene were added. The temperature was further increased to 225° C. and maintained for 2 hours while the mixture was agitated. The polyester-carboxylic acid adduct so produced was characterized as a viscous, dark liquid.

(C) To the agitated polyester carboxylic acid adduct at 90° C. were added 295 grams of N,N-dimethylethanolamine (3.32 equivalents) in 179 grams of water. The acid number was determined using alcoholic KOH, and was found to be 83.6 which indicated substantially complete hydrolysis of the maleic anhydride. Agitation was continued for 15 minutes at the end of which time a solution of 537 grams of n-propoxypropanol in 134 grams of butyl carbitol was added. Amidst additional stirring, 1284 grams of water were also added. This solution contained about 40 percent by weight resin solids which were completely dissolved.

Example 12

(A) To a five-liter flask equipped with a stirrer was added 374 grams of 4-oxatetracyclo[6.2.1.0$^{2,7}$.0$^{3,5}$]undecan-9(10)-ol (6.76 equivalents), 858 grams of tall fatty acids (3.00 equivalents), 203 grams of phthalic anhydride (2.74 equivalents), 13 grams of maleic anhydride (0.26 equivalent) and 100 grams of xylene as a diluent for the reaction mixture. The reaction mixture was heated under an atmospheric of nitrogen to 225° C. and maintained at this temperature for 11½ hours. During this time the water of esterification was vaporized and was removed as a constant boiling azeotrope with xylene. The reaction product appeared as a moderately viscous dark liquid which upon titration with KOH was found to have an acid number of 17.0 which indicated the esterification was substantially complete.

(B) The reaction product mixture obtained in A, above, was then cooled to 50° C. and 172 grams of tall fatty acids (0.601 equivalent) were added. This constituted an 8.89 percent excess based upon the original hydroxyl equivalency of the 4-oxatetracyclo[6.2.1.0$^{2,7}$.0$^{3,5}$]undecan-9(10)-ol. Maintaining this temperature, 150 grams of maleic anhydride (3.07 equivalents) were then added. To prevent discoloration of the polyester 8.6 grams of diphenylpentaerythritol diphosphite, a stabilizer, were added with maleic acid anhydride. The temperature of the mixture was increased to 100° C. and 1.72 grams of iodine dissolved in 17.2 grams of xylene were added. The temperature was further increased to 225° C. and maintained for 2 hours while the mixture was agitated. The polyester-carboxylic acid adduct so produced was characterized as a viscous dark liquid.

(C) To the agitated polyester carboxylic acid adduct at 90° C. were added 359 grams of N,N-dimethylethanolamine (4.03 equivalents) in 183 grams of water. The acid number was determined using alcoholic KOH, and was found to be 98.8 which indicated substantially complete hydrolysis of the maleic anhydride. Agitation was continued for 15 minutes at the end of which time a solution of 548 grams of n-propoxylpropanol in 137 grams of butyl carbitol was added. Amidst additional stirring, 1309 grams of water were also added. This solution contained about 40 percent by weight resin solids which were completely dissolved.

Example 13

(A) To a five-liter flask equipped with a stirrer are added 444 grams of 10-oxapentacyclo[6.3.1.1$^{3,6}$.0$^{2,7}$.0$^{9,11}$]tridec-4,5-di(oxyethanol) (6.0 equivalents), 987 grams of tall fatty acids (3.45 equivalents) and 186 grams of adipic acid (2.55 equivalents), and 100 grams of xylene as a diluent for the reaction mixture. The reaction mixture is heated under an atmosphere of nitrogen to 225° C. and maintained at this temperature for 10 hours. During this time the water of esterification is vaporized and is removed as a constant boiling azeotrope with xylene.

(B) The reaction product mixture obtained in A, above, is then cooled to 50° C. and 172 grams of tall fatty acids (0.60 equivalent) are added. This constitutes a 10 percent excess based upon the original hydroxyl equivalency of the 10 - oxapentacyclo[6.3.1.1$^{3,6}$.0$^{2,7}$.0$^{9,11}$]tridec-4,5 - di(oxyethanol). Maintaining this temperature, 224 grams of glutaconic acid (3.4 equivalents) are then added. To prevent discoloration of the polyester 9.7 grams of diphenylpentaerythritol diphosphite, a stabilizer, are added with the glutaconic acid. The temperature of the mixture is increased to 100° C., and 1.93 grams of iodine dissolved in 19.3 grams of xylene are added. The temperature is further increased to 225° C. and maintained for 2 hours while the mixture is agitated.

(C) To the agitated polyester carboxylic acid adduct at 90° C. are added 392 grams of N,N-dimethylethanolamine (4.40 equivalents) in 205 grams of water. Agitation is continued for 15 minutes at the end of which time a solution of 614 grams of n-propoxypropanol in 154 grams of butyl carbitol is added. Amdist additional stirring, 1468 grams of water are also added. This solution contains about 40 percent by weight resin solids which are completely dissolved.

Example 14

(A) To a five-liter flask equipped with a stirrer are added 300 grams of tricyclo[5.2.1.0$^{2,6}$]decan-4,5,8,9-tetrol (6.0 equivalents), 925 grams of soya fatty acids (3.3 equivalents) and 159 grams of succinic acid (2.7 equivalents), and 100 grams of xylene as a diluent for the reaction mixture. The reaction mixture is heated under an atmosphere of nitrogen to 225° C. and maintained at this temperature for 10 hours. During this time the water of esterification is vaporized and is removed as a constant boiling azeotrope with xylene.

(B) The reaction product mixture obtained in A, above, is then cooled to 50° C. and 219 grams of soya fatty acids (0.78 equivalent) are added. This constitutes a 13 percent excess based upon the original hydroxyl equivalency of the tricyclo-[5.2.1.0$^{2,6}$]decan-4,5,8,9-tetrol. Maintaining this temperature, 196 grams of ethylidene malonic acid (3.01 equivalents) are then added. To prevent discoloration of the polyester 8.4 grams of diphenylpentaerythritol diphosphite, a stabilizer, are added with the ethylidene malonic acid. The temperature of the mixture is increased to 100° C. and 1.69 grams of iodine dissolved in 16.9 grams of xylene are added. The temperature is further increased to 225° C. and maintained for 2 hours while the mixture is agitated.

(C) To the agitated polyester carboxylic acid adduct at 90° C. are added 421 grams of N-methyl morpholine (4.17 equivalents) in 179 grams of water. Agitation is continued for 15 minutes at the end of which time a solution of 538 grams of n-propoxypropanol in 134 grams of butyl carbitol is added. Amidst additional stirring, 1285 grams of water are also added. This solution contains about 40 percent by weight resin solids which are completely dissolved.

EXAMPLE 15

(A) To a five-liter flask equipped with a stirrer are added 300 grams of tricyclo[5.2.1.0$^{2,6}$]decane-4,5,8,9-tetrol (6.0 equivalents), 1144 grams of soya fatty acids (4.08 equivalents) and 138 grams of 1,2,4-hexanetricarboxylic acid (1.92 equivalents), and 100 grams of xylene as a diluent for the reaction mixture. The reaction mixture is heated under an atmosphere of nitrogen to 225° C. and maintained at this temperature for 10 hours. During this time the water of esterification is vaporized and is removed as a constant boiling azeotrope with xylene.

(B) The reaction product mixture obtained in A, above, is then cooled to 50° C. and 168 grams of soya fatty acids (0.6 equivalent) are added. This constitutes a 10 percent excess based upon the original hydroxyl equivalency of the tricyclo - [5.2.1.0$^{2,6}$]decane - 4,5,8,9-tetrol. Maintaining this temperature, 107 grams of maleic anhydride (2.18 equivalents) are then added. To prevent discoloration of the polyester 8.7 grams of diphenylpentaerythritol diphosphite, a stabilizer, are added with the maleic acid anhydride. The temperature of the mixture is increased to 100° C. and 1.75 grams of iodine dissolved in 17.5 grams of xylene are added. The temperature is further increased to 225° C. and maintained for 2 hours while the mixture is agitated.

(C) To the agitated polyester carboxylic acid adduct at 90° C. are added 260 grams of piperidine (3.06 equivalents) in 185 grams of water. Agitation is continued for 15 minutes at the end of which time a solution of 556 grams of n-butoxypropanol in 139 grams of butyl carbitol is added. Amidst additional stirring, 1329 grams of water are also added. This solution contains about 40 percent by weight resin solids which are completely dissolved.

In like manner when 411 grams of 5-oxaheptacyclo-[7.6.1.1$^{3,7}$.1$^{11,14}$.0$^{2,8}$.0$^{10,15}$]octadecane - 12,13 - diol (6.0 equivalents) is used in place of tricyclo[5.2.1.0$^{2,6}$]decane-4,5,8,9-tetrol in the above procedure, there is obtained an amine-modified polyester-carboxylic adduct which is completely soluble in 695 grams of n-propoxypropanol and 1329 grams of water to yield a solution containing approximately 40 percent resin solids.

EXAMPLE 16

(A) To a five-liter flask equipped with a stirrer are added 312 grams of 10-oxapentacyclo[6.3.1.1$^{3,6}$.0$^{3,7}$.0$^{9,11}$] tridecane-4,5-diol (6.0 equivalents), 1009 grams of soya fatty acids (3.6 equivalents) and 120 grams of succinic anhydride (2.4 equivalents), and 100 grams of xylene as a diluent for the reaction mixture. The reaction mixture is heated under an atmosphere of nitrogen to 225° C. and maintained at this temperature for 10 hours. During this time the water of esterification is vaporized and is removed as a constant boiling azeotrope with xylene.

(B) The reaction product mixture obtained in A, above, is then cooled to 50° C. and 84 grams of soya fatty acids (0.3 equivalent) are added. This constitutes a 5 percent excess based upon the original hydroxyl equivalency of the 10-oxapentacyclo[6.3.1.1$^{3,6}$.0$^{2,7}$.0$^{9,11}$] tridecane-4,5-diol. Maintaining this temperature, 79 grams of fumaric acid (1.37 equivalents) are then added. To prevent discoloration of the polyester 7.7 grams of diphenylpentaerythritol diphosphite, a stabilizer, are added with the fumaric acid. The temperature of the mixture is increased to 100° C. and 1.54 grams of iodine dissolved in 15.4 grams of xylene are added. The temperature is further increased to 225° C. and maintained for 2 hours while the mixture is agitated.

(C) To the agitated polyester carboxylic acid adduct at 80° C. are added 186 grams of triethylamine (1.84 equivalents) in 163 grams of water. Agitation is continued for 15 minutes at the end of which time a solution of 489 grams of n-propoxypropanol in 122 grams of butyl carbitol is added. Amidst additional stirring, 1170 grams of water are also added. This solution contains about 40 percent by weight resin solids which are completely dissolved.

In like manner when 546 grams of 5-oxapentacyclo-[7.6.1.0$^{2,8}$.0$^{4,6}$.0$^{10,15}$]hexadec - 12 - ylmethyleneoxyhexanediol (6.0 equivalents) are used in place of 10-oxapentacyclo-[6.3.1.1$^{3,6}$.0$^{2,7}$.0$^{9,11}$]tridecane-4,5-diol in the above procedure, there is obtained an amine-modified polyestercarboxylic adduct which is completely soluble in 611 grams of n-propoxypropanol and 1170 grams of water to yield a solution containing approximately 40 percent resin solids.

Example 17

(A) To a five-liter flask equipped with a stirrer are added 246 grams of 5,10-dioxapentacyclo[6.3.1.0$^{2,7}$.0$^{4,6}$.0$^{9,11}$]-dodecane (6.0 equivalents), 944 grams of tall fatty acids (3.30 equivalents) and 221 grams of bicyclo[2.2.1]-5-heptene-2,3-dicarboxylic anhydride (2.70 equivalents), and 100 grams of xylene as a diluent for the reaction mixture. The reaction mixture is heated under an atmosphere of nitrogen to 225° C. and maintained at this temperature for 10 hours. During this time the water of esterification is vaporized and is removed as a constant boiling azeotrope with xylene.

(B) The reaction product mixture obtained in A, above, is then cooled to 50° C. and 223 grams of tall fatty acids (0.78 equivalent) are added. This constitues a 13 percent excess based upon the original hydroxyl equivalency of the 5,10 - dioxapentacyclo[6.3.1.0$^{2,7}$.0$^{4,6}$.0$^{9,11}$]dodecane. Maintaining this temperature, 185 grams of itaconic acid (2.85 equivalents) are then added. To prevent discoloration of the polyester 8.8 grams of diphenylpentaerythritol diphosphite, a stabilizer, are added with the itaconic acid. The temperature of the mixture is increased to 100° C. and 1.77 grams of iodine dissolved in 17.7 grams of xylene are added. The temperature is further increased to 225° C. and maintained for 2 hours while the mixture is agitated.

(C) To the agitated polyester carboxylic acid adduct at 90° C. are added 348 grams of morpholine (4.00 equivalents) in 188 grams of water. Agitation is continued for 15 minutes at the end of which time 706 grams of butyl carbitol is added. Amidst additional stirring, 1351 grams of water are also added. This solution contains about 40 percent by weight resin solids which are completely dissolved.

Example 18

(A) To a five-liter flask equipped with a stirrer was added 374 grams of 4-oxatetracyclo[6.2.1.0$^{2,7}$.0$^{3,5}$]-undecan-9 (10)-ol (6.0 equivalents), 191 grams of phthalic anhydride (2.58 equivalents), 12 grams of maleic anhydride (0.24 equivalent) and 790 grams of soya acid (2.82 equivalents), and 100 grams of xylene as a diluent for the reaction mixture. The reaction mixture was heated under an atmosphere of nitrogen to 225° C. and maintained at this temperature for about 4 hours. An additional 100 grams of soya acid (.357 equivalent) was then added and heating continued for about 8 hours. During this time the water of esterification was vaporized and was removed as a constant boiling azeotrope with xylene. The reaction product appeared as a thick viscous liquid which upon titration with KOH was found to have an acid number of 15.6 which indicated the esterification was substantially complete.

(B) The reaction product mixture obtained in A, above, was then cooled to ambient temperature overnight, and 170 grams of soya acid (.607 equivalent) was added. This consititued about a 10 percent excess based upon the original hydroxyl equivalency of the 4-oxatetracyclo [6.2.1.0$^{2,7}$.0$^{3,5}$]undecan - 9-(10) - ol. Then 135 grams of maleic anhydride (2.76 equivalents) were added. To prevent discoloration of the polyester 8.6 grams of diphenyl pentaerythritol diphosphite, a stabilizer, were added with the maleic acid anhydride. The temperature of the mixture was increased to 100° C. and 1.72 grams of iodine dissolved in 17.2 grams of xylene were added. The temperature was further increased to 225° C. and maintained for about 3 hours while the mixture was agitated.

(C) To the agitated polyester carboxylic acid adduct at less than 100° C. was added 330 grams of dimethylethanol amine (3.70 equivalents) in 183 grams of water. The acid number was determined using sodium methoxide, was found to be 84.1 which indicated substantially complete hydrolysis of the maleic anhydride. Agitation was continued and a solution of 548 grams of n-propoxypropanol in 137 grams of butyl carbitol was added. Amidst additional stirring, 1309 grams of water were also added. This solution contained about 40 percent by weight resin solids which were completely dissolved.

Example 9

(A) To a five-liter flask equipped with a stirrer was added 374 grams of 4-oxateracyclo[6.2.1.0$^{2,7}$.0$^{3,5}$]undecan-9,(10)-ol (6.0 equivalents), 255 grams of tetrahydrophthalic anhydride (3.36 equivalents) and 958 grams of soya acid (3.42 equivalents), and xylene as a diluent for the reaction mixture. The reaction mixture was heated under an atmosphere of nitrogen to 225° C. and maintained at this temperature for about 11 hours. During this time the water of esterification was vaporized and was removed as a constant boiling azeotrope with xylene. The reaction product appeared as a moderately thick liquid which upon titration with KOH was found to have an acid number of 21.3 which indicated the esterification was substantially complete.

(B) The reaction product mixture obtained in A, above, was then cooled to 48° C. and 147 grams of maleic anhydride (3.0 equivalents) was added. To prevent discoloration of the polyester 8.4 grams of diphenylpentaerythritol diphosphite, a stabilizer, are added with the maleic acid anhydride. The temperature of the mixture was increased to 100° C. and 1.68 grams of iodine dissolved in 16.8 grams of xylene were added. The temperature was further increased to 225° C. and maintained for about 2 hours while the mixture was agitated.

(C) To the agitated polyester carboxylic acid adduct at 95° C. was added 369.0 grams of dimethylethanolamine (4.15 equivalents) in 179.1 grams of water. Agitation was continued for 15 minutes at the end of which time a solution of 537 grams of n-propoxypropanol in 135 grams of butyl carbitol was added. Amidst additional stirring, 1284 grams of water were also added. This solution contained about 40 percent by weight resin solids which were completely dissolved.

Example 20

(A) To a five-liter flask equipped with a stirrer was added 373.50 grams of 4-oxatetracyclo[6.2.1.0$^{2,7}$.0$^{3,5}$] undecan-9-(10)-ol (6 equivalents), 255.36 grams of tetrahydrophthalic anhydride (3.36 equivalents) and 723.36 grams of safflower fatty acids (2.64 equivalents), and xylene as a diluent for the reaction mixture. The reaction mixture was heated under an atmosphere of nitrogen to 225° C. and maintained at this temperature for about 7 hours. During this time the water of esterification was vaporized and was removed as a constant boiling azeotrope with xylene. The reaction product appeared as a moderately thick yellow liquid which upon titration with KOH was found to have an acid number of 17.2 which indicated the esterification was substantially complete.

(B) The reaction product mixture obtained in A, above, was then cooled to 60° C. and 213.72 grams of safflower fatty acid (0.78 equivalent) was added. This constituted about a 13 percent excess based upon the original hydroxyl equivalency of the 4-oxatetracyclo- [6.2.1.0$^{2,7}$.0$^{3,5}$]undecan-9-(10)-ol. Maintaining this temperature, 125.44 grams of maleic anhydride (2.56 equivalents) were then added. To prevent discoloration of the polyester 9.00 grams of diphenylpentaerythritol diphosphite, a stabilizer, are added with the maleic acid anhydride. The temperature of the mixture was increased to 100° C. and 1.80 grams of iodine dissolved in 18.0 grams of xylene were added. The temperature was further increased to 225° C. and maintained for about 2 hours while the mixture was agitated.

·(C) To the agitated polyester carboxylic acid adduct at 94° C. was added 239.4 grams of dimethylethanolamine in 176.5 grams of water. Agitation was continued for 15 minutes at the end of which time a solution of 529.6 grams of n-propoxypropanol in 132.40 grams of butyl carbitol was added. This solution contained about 40 percent by weight resin solids which were completely dissolved.

The solutions containing approximately 40 percent resin solids as prepared in the foregoing examples were subjected to various tests to determine their water compatibility and their film forming properties when applied as a coating. The tests were carried out as follows:

(A) 30 percent water tolerance.—An amount of solution prepared in the designated example containing 4.0 grams of resin solids was diluted with water to produce a solution having a total weight of 13.33 grams and 30 percent by weight resin solids. Where necessary the solution was placed on a roll and a single continuous liquid phase was formed. The solution was examined for clarity and was considered to pass the test if ruled lines about ½ inch apart could be seen through the solution in a 125 millimeter Erlenmeyer flask.

(B) *5 percent water tolerance.*—An amount of solution prepared in the designated example containing 1.25 grams of resin solids was diluted with water to produce a solution having a total weight of 25 grams. The solution was examined for clarity using the same criterion as the 30 percent water tolerance test above.

(C) *Cloud point.*—Solutions which passed the 30 percent water tolerance test were slowly diluted with water until clouding of the solution began to appear as a result of the resin coming out of solution. The cloud point is represented as the percent of resin solids in the solution at which the clouding commences.

(D) *Drying time.*—To determine drying time the vehicles were cast with a doctor blade to form films 4 mils thick. The film was deemed set to touch when none of the film adhered to the finger following touch. A film which dried until paper free did not produce any noise when a strip of paper pressed onto the film was removed. These tests are encompassed in Federal Test Method Standard Nos. 141 and 4061.

Results are tabulated in Table I below.

pound. An alkaline solution of 2 percent trisodium phosphite in water was employed. Both the forward and return portion of the brush cycle were counted as one stroke. The test was terminated after 1500 strokes if no erosion of the film was observed, or at the number of strokes at which film failure occurred.

*Adhesion.*—Wet adhesion was measured as the adhesion of the film to a glossy surface under moisture conditions and was determined by laying the test film over a commercially available high gloss enamel. After drying of the test film a razor slit in the film was made and the film was soaked in water for 30 minutes. The film was then subjected to scrubbing with water on the Gardner Straight Line Washability Machine. Erosion or peeling, if any, at the slit was noted after 5000 strokes. Sooner failure of the film is noted at the stroke when failure occurred.

Dry adhesion was measured as adhesion to a glossy surface under normal conditions. The test film was laid over the high gloss enamel as in the wet adhesion test. After drying a multiplicity of crosshatched slits were made in the film with razor blades outlining scarified

TABLE I.—PHYSICAL PROPERTIES OF COATINGS

| | Resin Solids Content, Wt. Percent | Water Tolerance at Room Temperature | | | | Cloud Point After 7 Days, Percent Solids | Drying Time [1] | | Hardness [2] Sward Values |
|---|---|---|---|---|---|---|---|---|---|
| | | 1 Day | | 7 Days | | | Set to Touch | Paper Free | |
| | | 5% | 30% | 5% | 30% | | | | |
| Example No.: | | | | | | | | | |
| 1 | 41.89 | No | No | No | No | >30 | 8¾ | 20 | 14 |
| 3 | 38.3 | Yes | Yes | Yes | Yes | <3.5 | <12 | 48 | 6 |
| 4 | 37.2 | Yes | Yes | Yes | Yes | <3.5 | <12 | 48 | 6 |
| 5 | 37.8 | Yes | Yes | Yes | Yes | <3.5 | <12 | 48 | 8 |
| 7 | 39.1 | Yes | Yes | Yes | Yes | <3.5 | 7 | 23 | 6 |
| 8 | 39.2 | Yes | Yes | Yes | Yes | <3.5 | 6½ | 23 | 8 |
| 9 | 40.9 | No | Yes | No | Yes | 12.8 | 5 | 9–24 | 16 |
| 10 | 40.9 | No | Yes | No | Yes | 23 | 6 | 8½ | 20 |
| 12 | 37.7 | No | Yes | No | Yes | 15 | 12–24 | 24–72 | 4 |

[1] Drying times were determined using 0.11 percent by weight of resin solids of a water dispersable cobalt drier marketed by NUODEX Products Company under the name Cyclodex 5.0% cobalt.
[2] Hardness values determined with Sward Rocker on steel panels after 4 days at room temperature.

To test the above prepared vehicles on finished paint formulations, high gloss water based enamel paints were prepared from the above vehicles using the following procedure.

250 grams of the vehicles containing approximately 40 percent resin solids prepared in the above examples were ground with 250 grams of rutile titanium dioxide. Grinding was accomplished by one pass on a 3 roll mill. To the pigmented vehicle was added about 362 grams of additional vehicle containing approximately 40 percent resin solids, premixed with 4.5 grams of the cobalt drier used in Table I above. The mixture was diluted with about 292 grams of water and stirred until uniform.

squares in the film. A plastic tape was pressed firmly on the film and pulled away sharply. The percent of scarified squares not removed by the tape was taken as a measure of dry adhesion.

*Gloss.*—Gloss of the paints was determined using a Gardner Glossmeter having a 60° Specular Gloss Exposure Head. Gloss readings are based optimally on 100. Readings were taken of each sample 1 day after drying and 14 days after drying.

*Hardness.*—Hardness readings were taken 3 days after application using a Sward rocker on glass panels.

In the following Table II the values obtained for the above tests are tabulated.

TABLE II.—PAINT PROPERTIES

| | pH | Stormer Vis., K.U. | Drying Time (hrs.) | | Scrub Resist. | Adhesion | | Sward Hardness 3 days | 60° Gloss | |
|---|---|---|---|---|---|---|---|---|---|---|
| | | | Touch | Paper Free | | Wet | Dry, Percent | | 1 day | 14 days |
| Paint A [1] | 9.0 | 91 | 7 | 72–96 | 1,500+ | Peel 3,850 | 95–99 | 4 | 98 | 97 |
| Paint B [2] | | 75 | 3 | 4½ | 1,500+ | 5 000+ | 100 | 8 | 88 | 74 |
| Example 4 | 9.15 | 70 | 5–7 | 9 | 1,500+ | V. slight 5,000+ | 100 | 12 | 90 | 87 |
| Example 5 | 9.12 | 72 | 5–7 | 9 | 1,500+ | 5 000+ | 99 | 14 | 90 | 87 |
| Example 7 | 9.55 | 75 | 9½ | 13½ | 1,500+ | Consid. 5,000+ | 100 | 10 | 92 | 92 |
| Example 8 | 9.50 | 88 | 9½ | 11½ | 1,500+ | Slight 5,000+ | 100 | 8 | 90 | 90 |
| Example 18 | 9.05 | 90 | 5–7 | 9 | 1,500+ | do | 96 | 10 | 92.5 | 87 |
| Example 19 | 9.32 | 61 | 5 | | 216 | Peel 5,000 | 100 | 13 | 96 | |
| Example 20 | 8.85 | 68 | 3 | 4½ | 1,500+ | 5,000+ | | 16 | 88 | |

[1] High gloss enamel formulated from a commercially available water compatible vehicle using same formulation as employed for vehicles of examples.   [2] Commercially available high gloss oil based enamel.

The paint compositions thus prepared were cast with a doctor blade to form films having a 7 mil wet film thickness. Following determination of pH and Stormer viscosity, in Krebs units, the films were subjected to the following tests, the results of which are tabulated in Table I.

*Drying time.*—Touch and paper drying time determined as described above in Table I. Time is recorded in hours.

*Scrub resistance.*—Scrub resistance tests were run after the film was dried for 3 days at 78° F. and 50 percent relative humidity using a Gardner Straight Line Washability Machine having a bristle brush with a total weight of one

What is claimed is:

1. A polyester-carboxylic acid adduct having pendant carboxyl groups and having an acid number of at least 35 which comprises the adduction product of an admixture containing (1) at least one compound selected from the group consisting of α,β-ethylenically unsaturated polycarboxylic acids and anhydrides, and (2) a polyester having an acid number less than 20 containing less than 20 percent by weight oxygen, said polyester obtained by reacting an admixture containing (a) a polycarbocyclic compound identified by a polycarbocyclic ring structure selected from the group consisting of the bicyclo[2.2.1] heptanoid ring and fused homocarbocyclic ring systems of which at least one bicyclo [2.2.1]heptanoid ring is an integral part, said polycarbocyclic compound containing at least 3 hydroxyl equivalents in the form of radicals of the group consisting of hydroxyl groups and up to 2 vicinal epoxy groups whose vicinal carbon atoms form part of said polycarbocylic ring structure, (b) an unsaturated monocarboxylic compound selected from the group consisting of unsaturated fatty acids and oils, and (c) a polycarboxylic compound selected from the group consisting of polycarboxylic acids and anhydrides and mixtures thereof, said monocarboxylic acid and polycarboxylic compound being present in sufficient relative amounts as to provide at least 0.9 carboxyl equivalent per hydroxyl equivalent of said polycarbocyclic compound.

2. A polyester-carboxylic acid adduct having pendant carboxyl groups and having an acid number of at least 35 which comprises the adduction product of an admixture containing (1) at least one compound selected from the group consisting of $\alpha,\beta$-ethylenically unsaturated polycarboxylic acids and anhydrides, and (2) a polyester having an acid number less than 20 containing less than 20 percent by weight oxygen, said polyester obtained by reacting an admixture containing (a) a polycarbocyclic compound identified by a polycarbocyclic ring structure containing 2 to 6 carbocycles selected from the group consisting of the bicyclo[2.2.1]heptanoid ring and fused homocarbocyclic ring systems of which at least one bicyclo [2.2.1] heptanoid ring is an integral part, said polycarbocyclic compound containing at least 3 hydroxyl equivalents in the form of radicals of the group consisting of hydroxyl groups and up to 2 vicinal epoxy groups whose vicinal carbon atoms form part of said polycarbocyclic ring structure, (b) an unsaturated monocarboxylic compound selected from the group consisting of unsaturated fatty acids and oils, and (c) a polycarboxylic compound selected from the group consisting of polycarboxylic acids and anhydrides and mixtures thereof, a major amount of which on an equivalent bases are free from ethylenic unsaturation in the positions alpha-beta to the carbonyl carbon atoms, said monocarboxylic acid and polycarboxylic compound being present in sufficient relative amounts as to provide at least 0.9 carboxyl equivalent per hydroxyl equivalent of said polycarbocyclic compound, and said polyester containing an excess of up to .25 carboxyl equivalent of said unsaturated monocarboxylic acid based on the hydroxyl equivalency of said polycarbocyclic compound.

3. A polyester-carboxylic acid adduct having pendant carboxyl groups and having an acid number of at least 35 which comprises the adduction product of an admixture containing (1) at least one compound selected from the group consisting of $\alpha,\beta$-ethylenically unsaturated polycarboxylic acids and anhydrides, and (2) a polyester having an acid number of less than 20, containing less than 20 percent by weight oxygen, said polyester obtained by reacting an admixture containing (a) a polycarbocyclic compound identified by a fused polycarbocyclic ring structure containing 3 to 4 carbocycles of which at least one bicyclo[2.2.1]heptanoid ring is an intergral part, said polycarbocyclic compound containing at least 3 hydroxyl equivalents in the form of radicals of the group consisting of hydroxyl groups and up to 2 vicinal epoxy groups whose vicinal carbon atoms form part of said polycarbocyclic ring structure, said hydroxyl groups selected from the class consisting of hydroxyl groups bonded directly to said polycarbocyclic structure and hydroxyl groups bonded to the polycyclic structure through alkylene, alkyleneoxy and poly(alkyleneoxy) radicals, (b) an unsaturated monocarboxylic compound selected from the group consisting of unsaturated fatty acids and oils, and (c) a polycarboxylic compound selected from the group consisting of polycarboxylic acids and anhydrides and mixtures thereof, a major amount of which, on a carboxyl equivalent bases, is free of ethylenic unsaturation in the positions alpha-beta to the carbonyl carbon atoms, said monocarboxylic acid and polycarboxylic compound being present in sufficient relative amounts as to provide at least 0.9 carboxyl equivalent per hydroxyl equivalent of said polycarbocyclic compound, said polyester containing an excess of up to 0.25 carboxyl equivalent of said unsaturated monocarboxylic acid and based on the hydroxyl equivalency of said polycarbocyclic compound.

4. A polyester-carboxylic acid adduct having pendant carboxyl groups and having an acid number of at least 35 which comprises the adduction product of an admixture containing (1) at least one compound selected from the group consisting of $\alpha,\beta$-ethylenically unsaturated polycarboxylic acids and anhydrides, and (2) a polyester having an acid number less than about 20, containing less than 20 percent by weight oxygen, said polyester obtained by reacting an admixture containing (a) a monoepoxy polycarbocyclic compound identified by a fused polycarbocyclic ring structure having 3 to 4 carbocycles of which at least one bicyclo[2.2.1]heptanoid ring is an integral part, said polycarbocyclic compound containing at least one hydroxyl group selected from the group consisting of hydroxyl groups bonded directly to said polycarbocyclic structure and hydroxyl groups bonded to said polycarbocyclic structure through alkylene, alkyleneoxy, and poly(alkyleneoxy) groups and one vicinal epoxy group whose vicinal carbon atoms form part of said polycarbocyclic ring structure, (b) an unsaturated monocarboxylic compound selected from the group consisting of unsaturated fatty acids and oils, and (c) a polycarboxylic compound selected from the group consisting of polycarboxylic acids and anhydrides and mixtures thereof, a major amount of which polycarboxylic compound is free from $\alpha,\beta$-ethylenic unsaturation said monocarboxylic acid and polycarboxylic compound being present in sufficient relative amounts as to provide at least 0.9 carboxyl equivalent per hydroxyl equivalent of said polycarbocyclic compound, said polyester containing an excess of up to 0.25 carboxyl equivalent of said unsaturated monocarboxylic acid based on the hydroxyl equivalency of said polycarbocyclic compound.

5. A polyester-carboxylic acid adduct having pendant carboxyl groups and having an acid number of at least 35, which comprises the adduction product of (1) at least one compound selected from the group consisting of $\alpha,\beta$-ethylenically unsaturated polycarboxylic acids and anhydrides, and (2) a polyester having an acid number of less than about 20, containing less than 20 percent by weight oxygen, said polyester obtained by reacting an admixture containing (a) a polycarbocyclic compound identified by a polycarbocyclic ring structure containing 3 to 4 carbocycles and from 5 to 6 carbon atoms per carbocycle of which at least one bicyclo[2.2.1]heptanoid ring is an integral part, said polycarbocyclic compound containing at least one hydroxyl group bonded directly to the polycarbocyclic ring and one vicinal epoxy group whose vicinal carbon atoms form part of said polycarbocyclic ring structure, (b) an unsaturated monocarboxylic compound selected from the group consisting of fatty acids and oils, and (c) from 0.1 to 0.75 carboxyl equivalents of a polycarboxylic compound per hydroxyl equivalent of said polycarbocyclic compound, said polycarboxylic compound selected from the group consisting of polycarboxylic acids and anhydrides and mixtures thereof, a major amount of which polycarboxylic compound is free from $\alpha,\beta$-ethylenic unsaturation, said monocarboxylic acid and polycarboxylic compound being present in sufficient relative amounts as to provide 0.9 carboxyl equivalent per hydroxyl equivalent of said polycarbocyclic compound, said polyester containing an excess of up to 0.25 carboxyl equivalent of said unsaturated monocarboxylic acid based on the hydroxyl equivalency of said polycarbocyclic compound.

6. The adudct of claim 5 wherein the polycarbocyclic compound is 4 - oxatetracyclo[6.2.1.0²,⁷.0³,⁵]undecan-9-(10)-ol.

7. A polyester-carboxylic acid adduct having pendant carboxyl groups and having an acid number of at least 35 which comprises the adduction product of (1) at least one compound selected from the group consisting of $\alpha,\beta$-ethylenically unsaturated polycarboxylic acids and anhydrides, and (2) a polyester having an acid number less than about 20 containing less than 20 percent by weight oxygen, said polyester obtained by reacting an admixture containing (a) a polycarbocyclic compound identified by a polycarbocyclic ring structure containing 3 to 4 carbocycles and from 5 to 6 carbon atoms per carbocycle of which structure at least one bicyclo[2.2.1]heptanoid ring is an integral part, said polycarbocyclic compound containing at least one hydroxyl group bonded to the carbocyclic ring through an alkyleneoxy group, and one vicinal epoxy group whose vicinal carbon atoms form part of said polycarbocyclic ring structure, (b) an unsaturated monocarboxylic compound selected from the group consisting of fatty acids and oils and (c) from 0.1 to 0.75 equivalent of a polycarboxylic compound per hydroxyl equivalent of said polycarbocyclic compound, said polycarboxylic compound selected from the group consisting of polycarboxylic acids and anhydrides and mixtures thereof, said monocarboxylic acid and polycarboxylic compound being present in sufficient relative amounts as to provide at least 0.9 carboxyl equivalent per hydroxyl equivalent of said polycarbocyclic compound said polyester containing an excess of up to 0.25 carboxyl equivalent of said unsaturated monocarbocyclic acid based on the hydroxyl equivalency of said polycarbocyclic compound.

8. A polyester-carboxylic acid adduct having pendant carboxyl groups and having an acid number of from about 40 to about 120 which comprises the adduction product of (1) maleic anhydride and (2) a polyester having an acid number less than about 20 containing less than 20 percent by weight oxygen, said polyester obtained by reacting an admixture containing (a) 4-oxatetracyclo-[6.2.1.0²,⁷.0³,⁵]undecan-9,10-ol, and (b) an unsaturated monocarboxylic compound selected from the group consisting of fatty acids and oils, and (c) a polycarboxylic compound selected from the group consisting of tetrahydrophthalic acid and anhydride and mixtures thereof, said monocarboxylic acid and polycarboxylic compound being present in sufficient relative amounts as to provide at least 0.9 carboxyl equivalent per hydroxyl equivalent of said polycarbocyclic compound, said polyester containing an excess of up to 0.25 carboxyl equivalent of said unsaturated monocarbocyclic acid based on the hydroxyl equivalency of said polycarbocyclic compound.

9. A water compatible polyester-carboxylic acid adduct having pendant hydrophilic groups which comprise the reaction product of the polyester-carboxylic acid adduct of claim 1 and a water soluble cation under aqueous conditions.

10. A water compatible polyester-carboxylic acid adduct having pendant quarternary ammonium groups which comprises the addition product, under aqueous conditions, of ammonia and the polyester-carboxylic acid adduct of claim 3.

11. A water compatible polyester-carboxylic acid adduct having pendant quarternary ammonium groups which comprises the reaction product of the polyester-carboxylic acid adduct of claim 4 and a member selected from the group consisting of ammonia and a water soluble amine under aqueous conditions, said amine being present in sufficient relative amount to react with at least all the pendant carboxyl groups of the said polyester-carboxylic acid adduct.

12. A water compatible polyester-carboxylic acid adduct having pendant quarternary ammonium groups which comprises the reaction product of the polyester-carboxylic acid adduct of claim 5 and a member selected from the group consisting of ammonia and a water soluble amine under aqueous conditions, said amine being present in sufficient relative amount to react with at least all the pendant carboxyl groups of the said polyester-carboxylic acid adduct.

13. A water compatible polyester-carboxylic acid adduct having pendant quarternary ammonium groups which comprises the reaction product of the polyester-carboxylic acid adduct of claim 6 and a member selected from the group consisting of ammonia and a water soluble amine under aqueous conditions, said amine being present in sufficient relative amount to react with at least all the pendant carboxyl groups of the said polyester-carboxylic acid adduct.

14. A water compatible polyester-carboxylic acid adduct having pendant quarternary ammonium groups which comprises the reaction product of the polyester-carboxylic acid adduct of claim 8 and a member selected from the group consisting of ammonia and a water soluble amine under aqueous conditions said amine being present in sufficient relative amount to react with at least all the pendant carboxyl groups of the said polyester-carboxylic acid adduct.

15. A water based paint composition comprising a non-volatile portion and a volatile portion, said non-volatile portion containing the water compatible polyester-carboxylic acid adduct of claim 10 and a pigment, and said volatile portion containing water and at least one organic solvent.

16. A water based paint composition comprising a non-volatile portion and a volatile portion, said non-volatile portion containing the water compatible polyester-carboxylic acid adduct of claim 10, and from about 10 to about 65 percent by volume of pigment based on the said non-volatile portion, and said volatile portion containing water and at least one organic solvent.

17. A water based paint composition comprising a non-volatile portion and a volatile portion said non-volatile portion containing the water compatible polyester-carboxylic acid of claim 10, and from about 10 to about 65 percent by volume of a pigment, based upon said non-volatile portion, and said volatile portion containing water and at least one organic solvent, said organic solvent being present in sufficient amount to permit dilution of the paint composition with water alone to a solution containing 5 percent by weight of said water compatible adduct, without causing said adduct to come out of solution.

18. The paint composition of claim 17 wherein said organic solvent is selected from the group consisting of water miscible alkylene glycols, dialkylene glycols and the monoalkyl and dialkyl ethers thereof.

References Cited

UNITED STATES PATENTS

| | | | |
|---|---|---|---|
| 2,969,336 | 1/1961 | Phillips et al. | 260—22 |
| 3,042,686 | 7/1962 | O'Brien et al. | 260—78.4 |
| 3,194,774 | 7/1965 | Nichols | 260—22 |
| 3,231,586 | 1/1966 | Tinsley | 260—22 |
| 3,247,137 | 4/1966 | McGary et al. | 260—348 |
| 3,280,152 | 10/1966 | Tinsley et al. | 260—348 |
| 3,340,213 | 9/1967 | McGary et al. | 260—22 |

JAMES A. SEIDLECK, Primary Examiner.

R. W. GRIFFIN, Assistant Examiner.

U.S. Cl. X.R.

117—167; 260—23, 23.7, 29.2, 32.4, 32.6, 33.2, 33.6, 40, 45.7, 45.8